US011237391B2

(12) United States Patent
Kweon et al.

(10) Patent No.: US 11,237,391 B2
(45) Date of Patent: Feb. 1, 2022

(54) HEAD-UP DISPLAY DEVICE FOR VEHICLE

(71) Applicant: LG Electronics Inc., Seoul (KR)

(72) Inventors: Ohjin Kweon, Seoul (KR); Jongmyeong Shim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 172 days.

(21) Appl. No.: 16/603,165

(22) PCT Filed: Apr. 6, 2018

(86) PCT No.: PCT/KR2018/004068
§ 371 (c)(1),
(2) Date: Oct. 4, 2019

(87) PCT Pub. No.: WO2018/186709
PCT Pub. Date: Oct. 11, 2018

(65) Prior Publication Data
US 2020/0033600 A1    Jan. 30, 2020

Related U.S. Application Data

(60) Provisional application No. 62/482,208, filed on Apr. 6, 2017.

(51) Int. Cl.
*G02B 27/01* (2006.01)
*G02B 5/30* (2006.01)
(Continued)

(52) U.S. Cl.
CPC ....... *G02B 27/0101* (2013.01); *G02B 5/3058* (2013.01); *G02B 17/02* (2013.01); *G02B 27/0149* (2013.01); *G02B 27/283* (2013.01)

(58) Field of Classification Search
CPC .... G03B 21/006; G03B 21/008; G03B 21/28; G03B 21/208; G03B 21/2013;
(Continued)

(56) References Cited

U.S. PATENT DOCUMENTS

2004/0196443 A1*  10/2004  Tomita .............. G03B 21/2073
                                                        353/94
2005/0157233 A1    7/2005  Wu et al.
(Continued)

FOREIGN PATENT DOCUMENTS

CN           106415362        2/2017
EP           3144716          3/2017
(Continued)

OTHER PUBLICATIONS

Extended European Search Report in European Appln. No. 18780827.4, dated Nov. 20, 2020, 10 pages.
(Continued)

*Primary Examiner* — Sultan Chowdhury
(74) *Attorney, Agent, or Firm* — Fish & Richardson P.C.

(57) ABSTRACT

Disclosed is a head-up display device for a vehicle including at least one light source, a liquid crystal display, and at least one polarization converter disposed between the light source and the liquid crystal display and configured to convert unpolarized light generated by the light source into single linearly polarized light and to provide the single linearly polarized light to the liquid crystal display.

18 Claims, 20 Drawing Sheets

(51) Int. Cl.
*G02B 17/02* (2006.01)
*G02B 27/28* (2006.01)

(58) Field of Classification Search
CPC ............ G03B 21/2033; G03B 21/2066; G03B 21/2073; H04N 9/315; H04N 9/317; H04N 9/3141; H04N 9/3152; H04N 9/3161; H04N 9/3164; H04N 9/3173; G02B 27/0101; G02B 27/0149; G02B 27/0172; G02B 27/02; G02B 27/10; G02B 27/14; G02B 27/28; G02B 27/141; G02B 27/283; G02B 27/286; G02B 27/1033; G02B 5/28; G02B 5/30; G02B 5/3025; G02B 5/3058; G02B 5/3083
See application file for complete search history.

(56) References Cited

U.S. PATENT DOCUMENTS

| | | | |
|---|---|---|---|
| 2009/0153962 A1 | 6/2009 | Okada et al. | |
| 2011/0149207 A1* | 6/2011 | Kawasumi | G02B 27/0018 349/96 |
| 2011/0292346 A1* | 12/2011 | Fok | G03B 21/2013 353/13 |
| 2013/0194556 A1* | 8/2013 | Chi | G02B 27/285 353/121 |
| 2014/0293230 A1* | 10/2014 | Arase | H04N 9/3129 353/13 |
| 2016/0041460 A1 | 2/2016 | Schuck et al. | |
| 2016/0202482 A1 | 7/2016 | Kuzuhara et al. | |
| 2016/0349507 A1 | 12/2016 | Hayashi | |
| 2017/0146803 A1* | 5/2017 | Kishigami | H04N 9/3167 |
| 2017/0336628 A1 | 11/2017 | Kim et al. | |

FOREIGN PATENT DOCUMENTS

| | | |
|---|---|---|
| JP | H07277030 | 10/1995 |
| JP | 2008203293 | 9/2008 |
| JP | 2016139050 | 8/2016 |
| KR | 1020120120496 | 11/2012 |
| KR | 1020160046812 | 4/2016 |
| KR | 1020170018095 | 2/2017 |

OTHER PUBLICATIONS

Korean Notice of Allowance in Korean Appln. No. 10-2018-7033985, dated Dec. 16, 2019, 3 pages (with English translation).
PCT International Search Report in International Appln. No. PCT/KR2018/004068, dated Aug. 9, 2018, 9 pages (with English translation).
CN Office Action in Chinese Appln. No. 201880037118.8, dated Apr. 25, 2021, 12 pages (with English translation).

* cited by examiner

HEAD-UP DISPLAY DEVICE FOR VEHICLE

CROSS-REFERENCE TO RELATED APPLICATIONS

This application is the National Stage filing under 35 U.S.C. 371 of International Application No. PCT/KR2018/004068, filed on Apr. 6, 2018, which claims the benefit of U.S. Provisional Application No. 62/482,208, filed on Apr. 6, 2017, the contents of both are incorporated by reference herein in their entirety.

TECHNICAL FIELD

The present invention relates to a head-up display device for a vehicle.

BACKGROUND ART

The development of various devices for interfacing between a vehicle and a user is required. In particular, research has been actively conducted on a head-up display device configured to generate a screen on the windshield so that a user is able to perceive information while driving.

In such a head-up display device, an image is displayed in a manner such that light generated by a light source penetrates a liquid crystal display.

Only one polarized component of the unpolarized light generated by the light source penetrates the display, and the other polarized component thereof is absorbed, which increases the temperature of the liquid crystal display.

In addition, since less than half of the optical energy generated by the light source is used to display an image, optical efficiency is low, and the cost required to display a desired image increases.

DISCLOSURE

Technical Problem

Therefore, the present invention has been made in view of the above problems, and it is an object of the present invention to provide a head-up display device for a vehicle that exhibits improved optical efficiency and reduced heat generation.

However, the objects to be accomplished by the invention are not limited to the above-mentioned objects, and other objects not mentioned herein will be clearly understood by those skilled in the art from the following description.

Technical Solution

In accordance with the present invention, the above objects can be accomplished by the provision of a head-up display device for a vehicle including a polarization converter for converting light generated by a light source into single linearly polarized light and providing the single linearly polarized light to a liquid crystal display.

Details of other embodiments are included in the detailed description and the accompanying drawings.

Advantageous Effects

According to the embodiments of the present invention, there are one or more effects as follows.

First, light generated by a light source may be converted into single linearly polarized light, and the single linearly polarized light may be provided to a liquid crystal display, thereby enhancing optical efficiency and thus reducing manufacturing costs.

Second, most of the generated light may be used to display an image, thereby reducing heat generation.

However, the effects achievable through the invention are not limited to the above-mentioned effects, and other effects not mentioned herein will be clearly understood by those skilled in the art from the appended claims.

BEST MODE

Reference will now be made in detail to the preferred embodiments of the present invention, examples of which are illustrated in the accompanying drawings. Wherever possible, the same reference numbers will be used throughout the drawings to refer to the same or like parts. As used herein, the suffixes "module" and "unit" are added or interchangeably used to facilitate preparation of this specification and are not intended to suggest unique meanings or functions. In describing embodiments disclosed in this specification, a detailed description of relevant well-known technologies may not be given in order not to obscure the subject matter of the present invention. In addition, the accompanying drawings are merely intended to facilitate understanding of the embodiments disclosed in this specification and not to restrict the technical spirit of the present invention. In addition, the accompanying drawings should be understood as covering all equivalents or substitutions within the scope of the present invention.

Terms including ordinal numbers such as first, second, etc. may be used to explain various elements. However, it will be appreciated that the elements are not limited to such terms. These terms are merely used to distinguish one element from another.

It will be understood that when an element is referred to as being "connected" or "coupled" to another element, it can be directly connected or coupled to another element or intervening elements may be present. In contrast, when an element is referred to as being "directly connected" or "directly coupled" to another element, there are no intervening elements present.

The expression of singularity includes a plural meaning unless the singularity expression is explicitly different in context.

It will be further understood that terms such as "include" or "have", when used in this specification, specify the presence of stated features, integers, steps, operations, elements, components, or combinations thereof, but do not preclude the presence or addition of one or more other features, integers, steps, operations, elements, components, or combinations thereof.

The vehicle described in this specification may conceptually include an automobile and a motorcycle. Hereinafter, description will be given mainly focusing on an automobile.

The vehicle described in this specification may be any of an internal combustion vehicle equipped with an engine as a power source, a hybrid vehicle equipped with an engine and an electric motor as power sources, an electric vehicle equipped with an electric motor as a power source, and the like.

In the description below, the left side of the vehicle means the left side with respect to the driving direction of the vehicle and the right side of the vehicle means the right side with respect to the driving direction of the vehicle.

Figure 1:
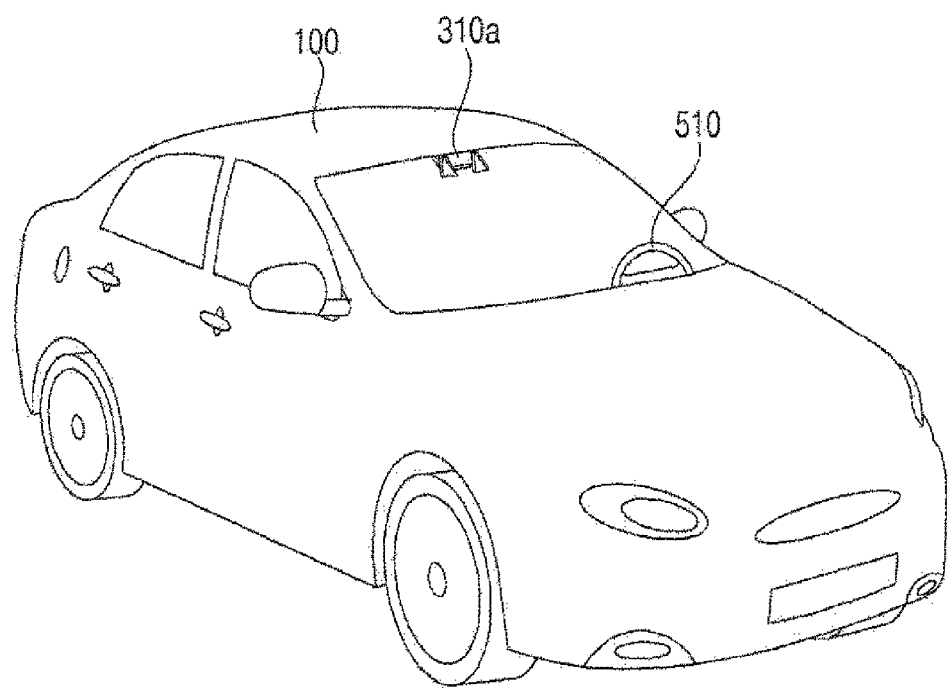
FIG. 1 is a view illustrating the external appearance of a vehicle according to an embodiment of the present invention.
Figure 1:
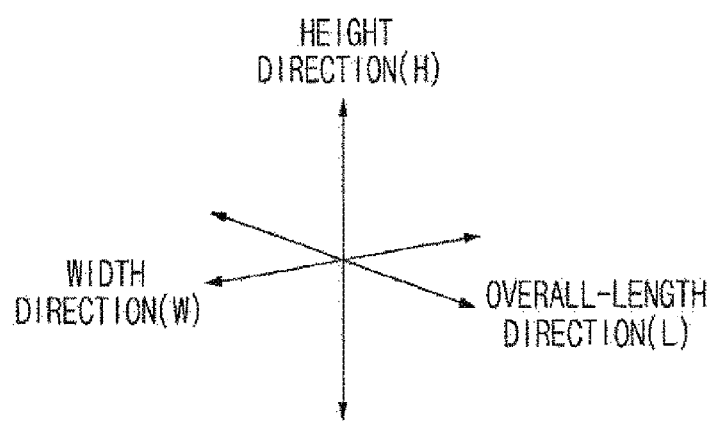

FIG. 1 is a view illustrating the external appearance of a vehicle according to an embodiment of the present invention.

Figure 2:
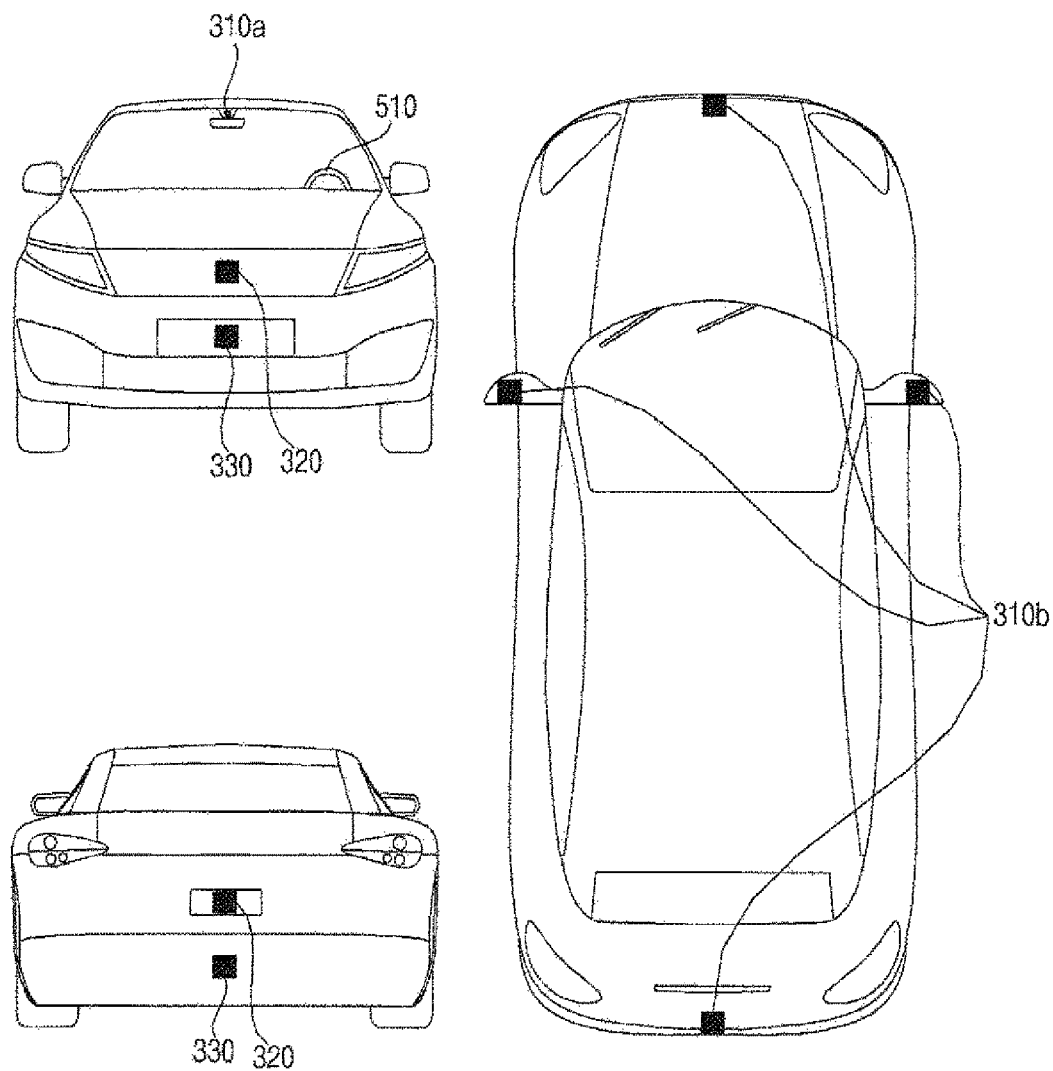
FIG. 2 is a view illustrating the external appearance of the vehicle according to the embodiment of the present invention, seen at various angles from the outside of the vehicle.

FIG. 2 is a view illustrating the external appearance of the vehicle according to the embodiment of the present invention, seen at various angles from the outside of the vehicle.

Figure 3:
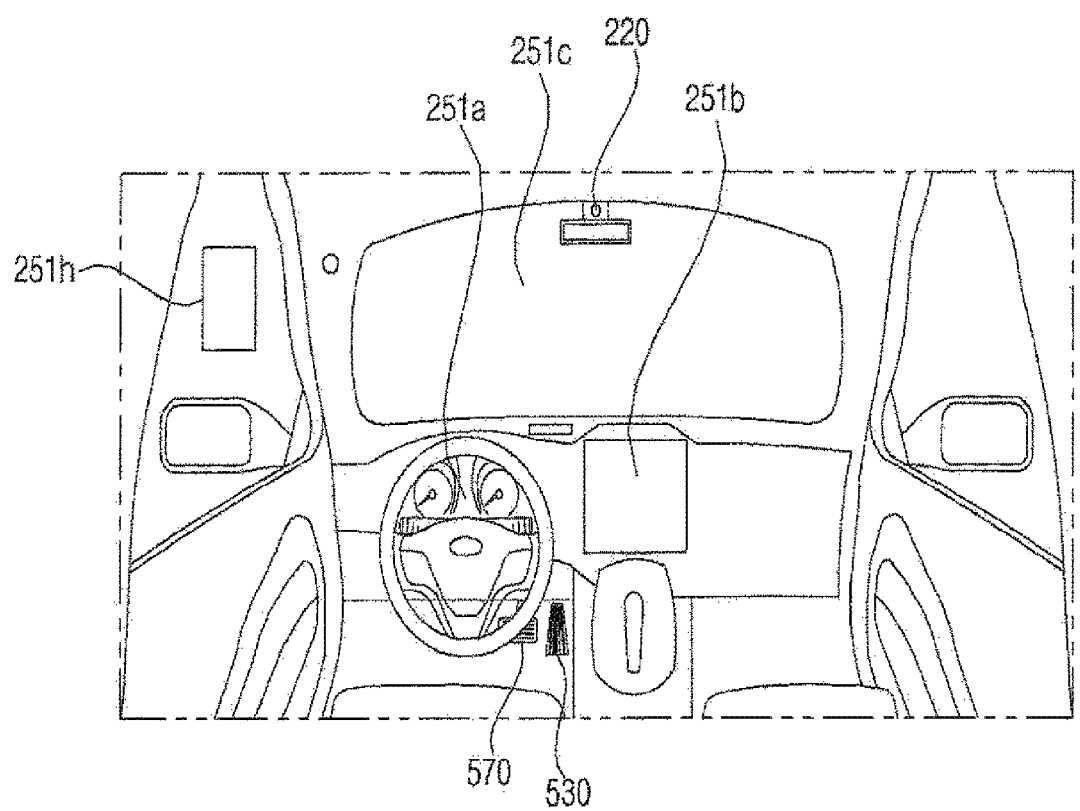
FIGS. 3 and 4 are views illustrating the interior of the vehicle according to the embodiment of the present invention.
Figure 4:
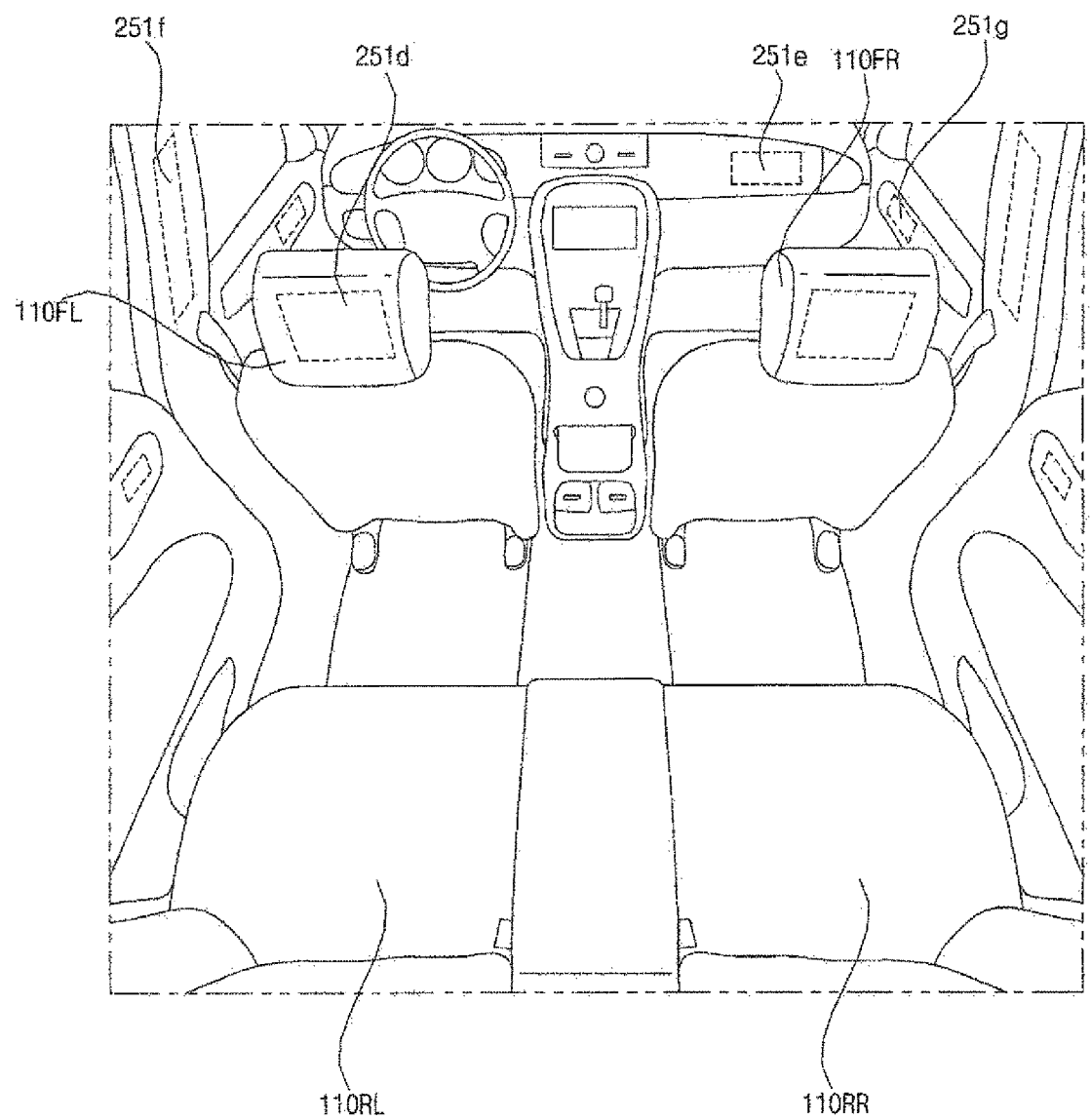

FIGS. 3 and 4 are views illustrating the interior of the vehicle according to the embodiment of the present invention.

Figure 5:
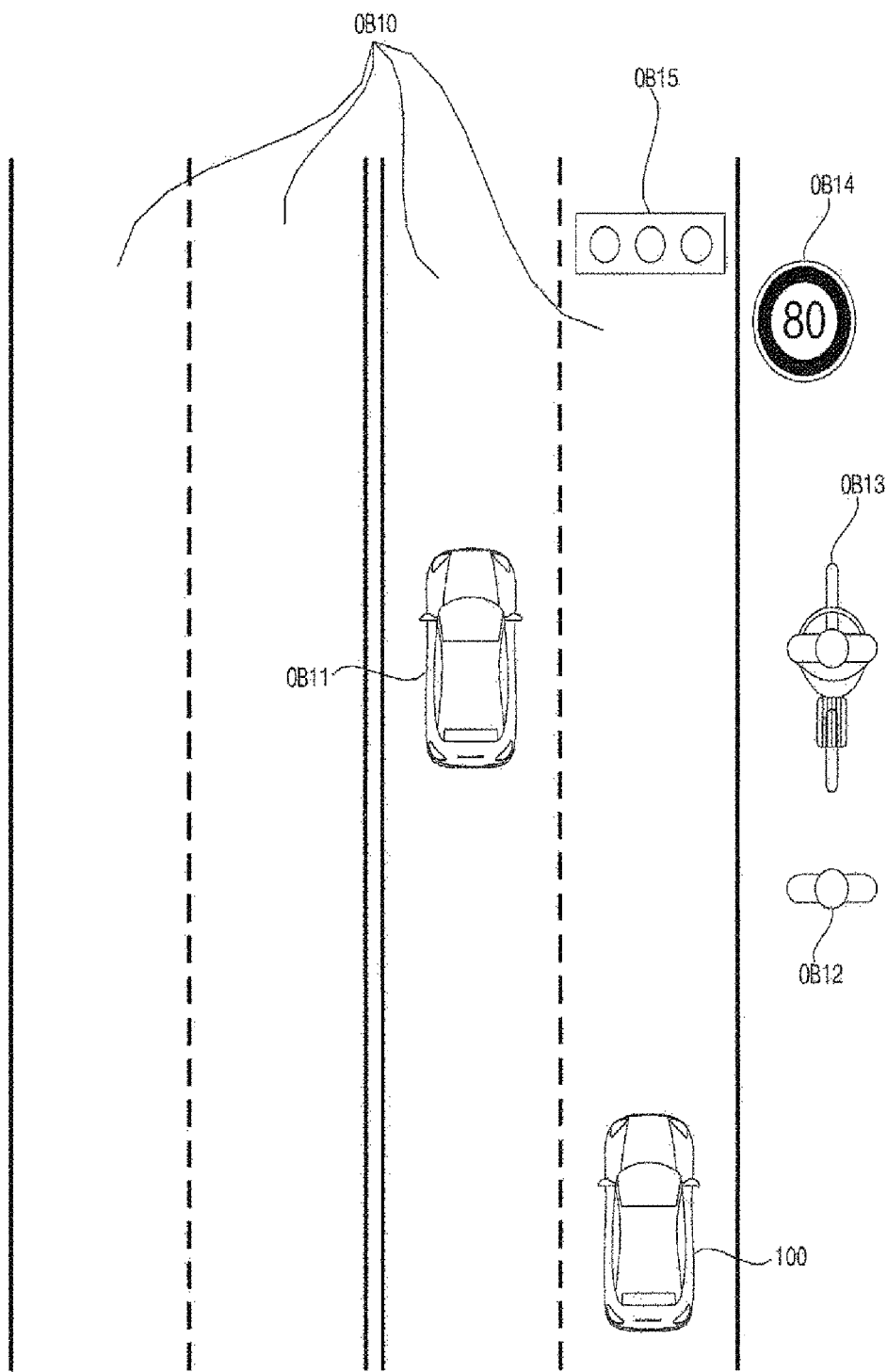
FIGS. 5 and 6 are views to be referred to for explaining objects according to the embodiment of the present invention.
Figure 6:
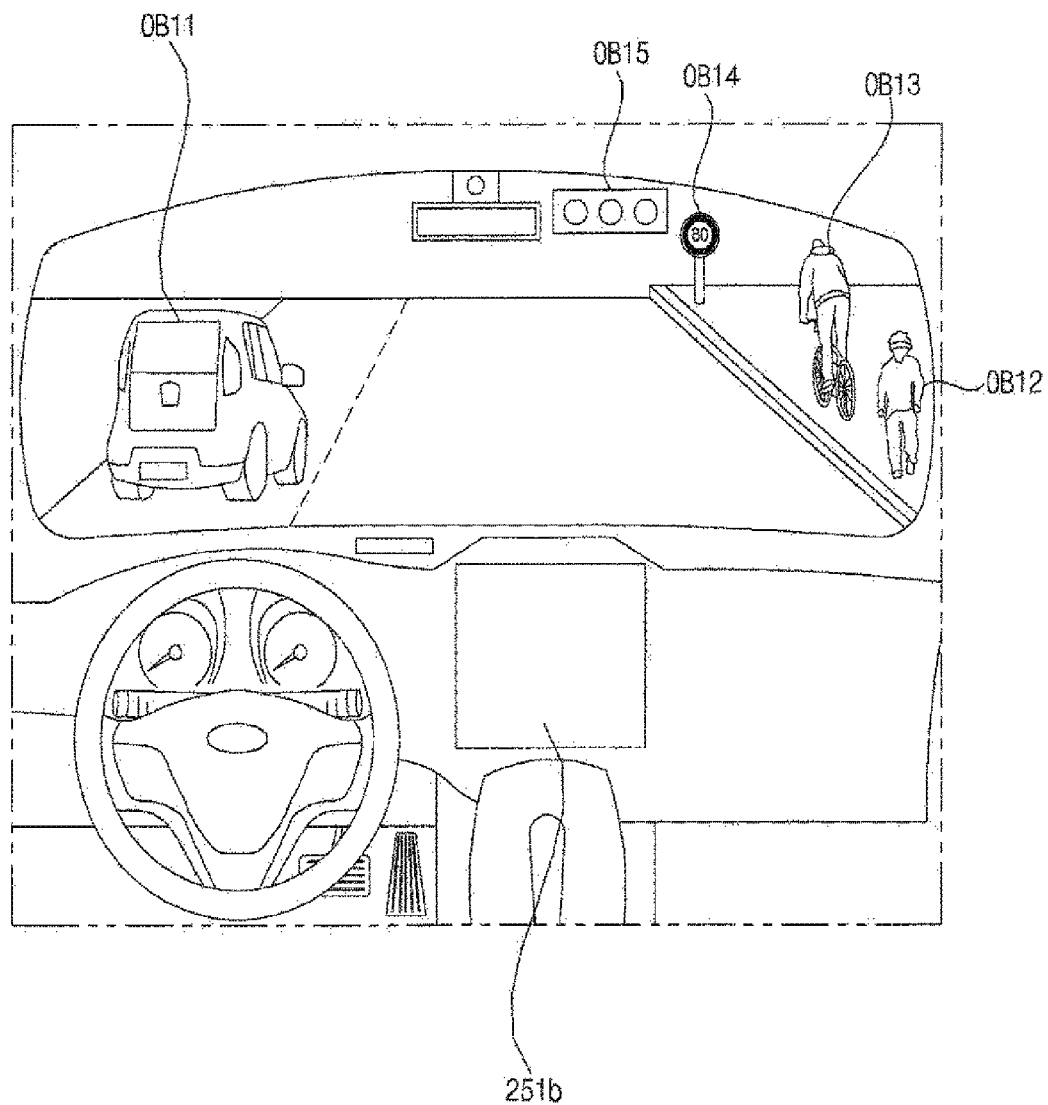

FIGS. 5 and 6 are views to be referred to for explaining objects according to the embodiment of the present invention.

Figure 7:
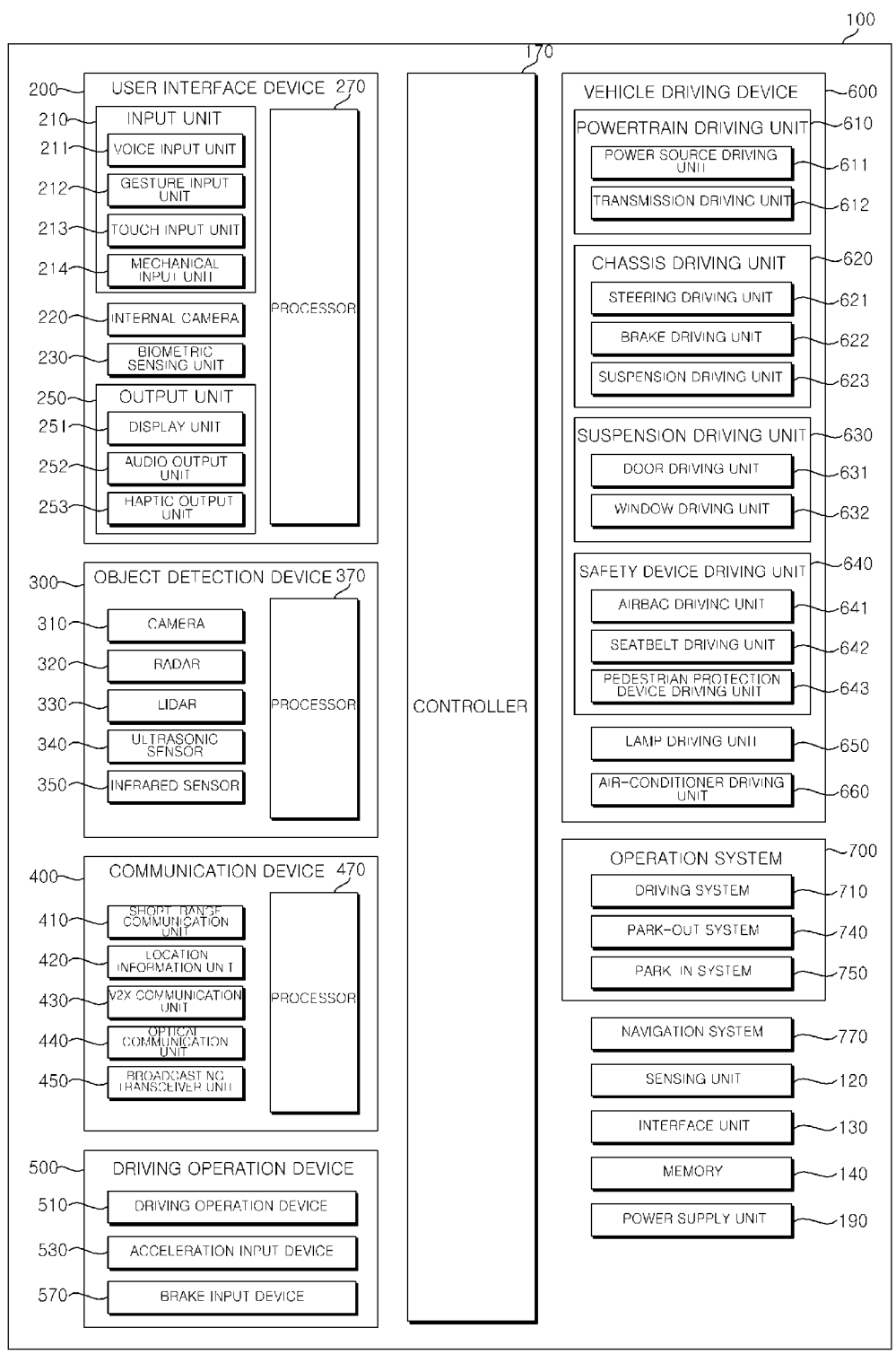
FIG. 7 is a block diagram to be referred to for explaining the vehicle according to the embodiment of the present invention.

FIG. 7 is a block diagram to be referred to for explaining the vehicle according to the embodiment of the present invention.

Referring to FIGS. 1 to 7, a vehicle 100 may include wheels configured to be rotated by a power source, and a steering input device 510 for controlling the driving direction of the vehicle 100.

The vehicle 100 may be an autonomous vehicle.

The vehicle 100 may be switched to an autonomous driving mode or a manual mode based on user input.

For example, the vehicle 100 may be switched from the manual mode to the autonomous driving mode or from the autonomous driving mode to the manual mode based on the user input received through a user interface device 200.

The vehicle 100 may be switched to the autonomous driving mode or the manual mode based on driving situation information.

The driving situation information may include at least one of information about objects outside the vehicle, navigation information, or vehicle state information.

For example, the vehicle 100 may be switched from the manual mode to the autonomous driving mode or from the autonomous driving mode to the manual mode based on the driving situation information generated by an object detection device 300.

For example, the vehicle 100 may be switched from the manual mode to the autonomous driving mode or from the autonomous driving mode to the manual mode based on the driving situation information received through a communication device 400.

The vehicle 100 may be switched from the manual mode to the autonomous driving mode or from the autonomous driving mode to the manual mode based on information, data, and signals provided from external devices.

When the vehicle 100 is driven in the autonomous driving mode, the autonomous vehicle 100 may be driven based on an operation system 700.

For example, the autonomous vehicle 100 may be driven based on information, data, or signals generated by a driving system 710, a park-out system 740, and a park-in system 750.

When the vehicle 100 is driven in the manual mode, the autonomous vehicle 100 may receive user input for driving through a driving operation device 500. The vehicle 100 may be driven based on the user input received through the driving operation device 500.

An overall length is a length from the front end to the rear end of the vehicle 100, an overall width is a width of the vehicle 100, and an overall height is a length from the bottom of the wheel to the roof of the vehicle 100. In the following description, an overall length direction L may be a direction based on which the overall length of the vehicle 100 is measured, an overall width direction W may be a direction based on which the overall width of the vehicle 100 is measured, and an overall height direction H may be a direction based on which the overall height of the vehicle 100 is measured.

As illustrated in FIG. 7, the vehicle 100 may include a user interface device 200, an object detection device 300, a communication device 400, a driving operation device 500, a vehicle driving device 600, an operation system 700, a navigation system 770, a sensing unit 120, an interface unit 130, a memory 140, a controller 170, and a power supply unit 190.

In some embodiments, the vehicle 100 may further include a new component in addition to the components described in the present disclosure, or may not include some of the described components.

The user interface device 200 is a device used to enable the vehicle 100 to communicate with a user. The user interface device 200 may receive user input and may provide information generated from the vehicle 100 to the user. The vehicle 100 may implement User Interface (UI) or User Experience (UX) through the user interface device 200.

The user interface device 200 may include an input unit 210, an internal camera 220, a biometric sensing unit 230, an output unit 250, and a processor 270.

In some embodiments, the user interface device 200 may further include a new component in addition to the above-described components, or may not include some of the above-described components.

The input unit 210 is used to receive information from a user. Data collected by the input unit 210 may be analyzed by the processor 270, and may be recognized as a control command from the user.

The input unit 210 may be disposed inside the vehicle. For example, the input unit 210 may be disposed in a portion of a steering wheel, a portion of an instrument panel, a portion of a seat, a portion of each pillar, a portion of a door, a portion of a center console, a portion of a head lining, a portion of a sun visor, a portion of a windshield, a portion of a window, or the like.

The input unit 210 may include a voice input unit 211, a gesture input unit 212, a touch input unit 213, and a mechanical input unit 214.

The voice input unit 211 may convert a voice input of the user into an electrical signal. The converted electrical signal may be provided to the processor 270 or the controller 170.

The voice input unit 211 may include one or more microphones.

The gesture input unit 212 may convert a gesture input of the user into an electrical signal. The converted electrical signal may be provided to the processor 270 or the controller 170.

The gesture input unit 212 may include at least one of an infrared sensor or an image sensor for sensing a gesture input of the user.

In some embodiments, the gesture input unit 212 may sense a three-dimensional gesture input of the user. To this end, the gesture input unit 212 may include a light output unit for emitting a plurality of infrared rays or a plurality of image sensors.

The gesture input unit 212 may sense a three-dimensional gesture input of the user using a Time-of-Flight (ToF) scheme, a structured light scheme, or a disparity scheme.

The touch input unit 213 may convert a touch input of the user into an electrical signal. The converted electrical signal may be provided to the processor 270 or the controller 170.

The touch input unit 213 may include a touch sensor for sensing a touch input of the user.

In some embodiments, the touch input unit 213 may be implemented as a touch screen by being integrated with a display unit 251. This touch screen may provide both an input interface and an output interface between the vehicle 100 and the user.

The mechanical input unit 214 may include at least one of a button, a dome switch, a jog wheel, or a jog switch. An electrical signal generated by the mechanical input unit 214 may be provided to the processor 270 or the controller 170.

The mechanical input unit 214 may be disposed on the steering wheel, the center fascia, the center console, the cockpit module, the door, or the like.

The internal camera 220 may acquire a vehicle interior image. The processor 270 may sense the state of a user based on the vehicle interior image. The processor 270 may acquire user gaze information from the vehicle interior image. The processor 270 may sense the user's gesture based on the vehicle interior image.

The biometric sensing unit 230 may acquire biometric information about a user. The biometric sensing unit 230 may include a sensor for acquiring biometric information about a user, and may acquire information about a fingerprint, heart beats, and the like of a user using the sensor. The biometric information may be used to authenticate the user.

The output unit 250 is used to generate a visual output, an acoustic output, or a haptic output.

The output unit 250 may include at least one of a display unit 251, an audio output unit 252, or a haptic output unit 253.

The display unit 251 may display graphic objects corresponding to various pieces of information.

The display unit 251 may include at least one of a Liquid Crystal Display (LCD), a Thin Film Transistor-LCD (TFT LCD), an Organic Light-Emitting Diode (OLED) display, a flexible display, a three-dimensional (3D) display, or an e-ink display.

The display unit 251 may be implemented as a touch screen by forming a multi-layered structure with the touch input unit 213 or by being integrated with the touch input unit 213.

The display unit 251 may be configured as a Head-up Display (HUD). If the display unit 251 is configured as a HUD, the display unit 251 may be provided with a projection module, and may output information through an image projected onto the windshield or the window.

The display unit 251 may include a transparent display. The transparent display may be attached onto the windshield or the window.

The transparent display may have a specific transparency and may display a specific screen. In order to be transparent, the transparent display may include at least one of a transparent Thin Film Electroluminescent (TFEL) display, a transparent Organic Light-Emitting Diode (OLED) display, a transparent Liquid Crystal Display (LCD), a transmissive transparent display, or a transparent Light-Emitting Diode (LED) display. The transparency of the transparent display is controllable.

The user interface device 200 may include a plurality of display units 251a to 251g.

The display unit 251 may be disposed in a portion of the steering wheel, portions 251a, 251b and 251e of the instrument panel, a portion 251d of the seat, a portion 251f of the pillar, a portion 251g of the door, a portion of the center console, a portion of the head lining, or a portion of the sun visor, or may be implemented in a portion 251c of the windshield or a portion 251h of the window.

The audio output unit 252 converts an electrical signal received from the processor 270 or the controller 170 into an audio signal and outputs the audio signal. To this end, the audio output unit 252 may include one or more speakers.

The haptic output unit 253 generates a haptic output. For example, the haptic output unit 253 may vibrate the steering wheel, the safety belt, or the seats 110FL, 110FR, 110RL, and 110RR, so that a user perceives the output.

The processor 270 may control the overall operation of each unit of the user interface device 200.

In some embodiments, the user interface device 200 may include a plurality of processors 270 or may not include a processor 270.

If the user interface device 200 does not include a processor 270, the user interface device 200 may operate under the control of a processor of another device in the vehicle 100, or under the control of the controller 170.

The user interface device 200 may be referred to as a vehicle display device.

The user interface device 200 may operate under the control of the controller 170.

The object detection device 300 is a device used to detect objects present outside the vehicle 100. The object detection device 300 may generate object information based on sensing data.

The object information may include information about the presence or absence of an object, information about the location of an object, information about the distance between the vehicle 100 and an object, and information about the relative speed of the vehicle 100 with respect to an object.

The object may be any of various items related to driving of the vehicle 100.

Referring to FIGS. 5 and 6, objects O may include lanes OB10, another vehicle OB11, a pedestrian OB12, a 2-wheeled vehicle OB13, traffic signals OB14 and OB15, a light, a road, a structure, a speed bump, a geographic feature, an animal, and so on.

The lanes OB10 may include a traveling lane, a lane next to the traveling lane, and a lane in which an oncoming vehicle is traveling. The lanes OB10 may conceptually include left and right lines that define each of the lanes. The lanes may conceptually include a crossroad.

Another vehicle OB11 may be a vehicle traveling in the vicinity of the vehicle 100. Another vehicle may be a vehicle located within a predetermined distance from the vehicle 100. For example, another vehicle OB11 may be a vehicle that precedes or follows the vehicle 100.

The pedestrian OB12 may be a person located in the vicinity of the vehicle 100. The pedestrian OB12 may be a person located within a predetermined distance from the vehicle 100. For example, the pedestrian OB12 may be a person on a sidewalk or a roadway.

The 2-wheeled vehicle OB13 may refer to a transportation means moving on two wheels around the vehicle 100. The 2-wheeled vehicle OB13 may be a transportation means having two wheels, located within a predetermined distance from the vehicle 100. For example, the 2-wheeled vehicle OB13 may be a motorcycle or bicycle on a sidewalk or a roadway.

The traffic signals may include a traffic light device OB15, a traffic sign OB14, and a symbol or text drawn or written on a road surface.

The light may be light generated from a lamp of another vehicle. The light may be light generated from a street lamp. The light may be sunlight.

The road may include a road surface, a curved road, an inclined road such as an uphill or downhill road, and so on.

The structure may be an object fixed on the ground near a road. For example, the structure may include a street lamp, a street tree, a building, a telephone pole, a traffic light device, a bridge, a curb, a wall, and so on.

The geographic feature may include a mountain, a hill, and so on.

Objects may be classified into mobile objects and fixed objects. For example, mobile objects may conceptually include another vehicle that is traveling and a pedestrian who is moving. For example, fixed objects may conceptually include a traffic signal, a road, a structure, another vehicle that is not moving, and a pedestrian who is not moving.

The object detection device 300 may include a camera 310, a Radio Detection and Ranging (RADAR) 320, a Light Detection and Ranging (LiDAR) 330, an ultrasonic sensor 340, an infrared sensor 350, and a processor 370.

In some embodiments, the object detection device 300 may further include a new component in addition to the above-described components, or may not include some of the above-described components.

In order to acquire a vehicle exterior image, the camera 310 may be disposed at an appropriate position on the exterior of the vehicle. The camera 310 may be a mono camera, a stereo camera 310*a*, an Around View Monitoring (AVM) camera 310*b*, or a 360-degree camera.

The camera 310 may acquire information about the location of an object, information about the distance to an object, or information about the relative speed with respect to an object using any of various image-processing algorithms.

For example, the camera 310 may acquire information about the distance to the object and information about the relative speed with respect to the object in the acquired image based on variation in the size of the object over time.

For example, the camera 310 may acquire information about the distance to the object and information about the relative speed with respect to the object through a pin hole model, road surface profiling, or the like.

For example, the camera 310 may acquire information about the distance to the object and information about the relative speed with respect to the object based on disparity information in the stereo image acquired by the stereo camera 310*a*.

For example, in order to acquire an image of a front view of the vehicle, the camera 310 may be disposed in the vicinity of a front windshield inside the vehicle. Alternatively, the camera 310 may be disposed around a front bumper or a radiator grill.

For example, in order to acquire an image of a rear view of the vehicle, the camera 310 may be disposed in the vicinity of a rear glass inside the vehicle. Alternatively, the camera 310 may be disposed around a rear bumper, a trunk, or a tailgate.

For example, in order to acquire an image of a side view of the vehicle, the camera 310 may be disposed in the vicinity of at least one of side windows inside the vehicle. Alternatively, the camera 310 may be disposed around a side mirror, a fender, or a door.

The camera 310 may provide the acquired image to the processor 370.

The RADAR 320 may include an electromagnetic wave transmitter and an electromagnetic wave receiver. The RADAR 320 may be embodied as pulse RADAR or continuous wave RADAR depending on the principle by which an electronic wave is emitted. The RADAR 320 may be embodied as Frequency Modulated Continuous Wave (FMCW)-type RADAR or Frequency Shift Keying (FSK)-type RADAR as a continuous wave RADAR scheme according to a signal waveform.

The RADAR 320 may detect an object using an electromagnetic wave based on a Time-of-Flight (ToF) scheme or a phase-shift scheme, and may detect the location of the detected object, the distance to the detected object, and the relative speed with respect to the detected object.

The RADAR 320 may be disposed at an appropriate position on the exterior of the vehicle in order to sense an object ahead of, behind, or beside the vehicle.

The LiDAR 330 may include a laser transmitter and a laser receiver. The LiDAR 330 may be implemented in a ToF scheme or a phase-shift scheme.

The LiDAR 330 may be implemented in a driven or non-driven manner.

If the LiDAR 330 is implemented in a driven manner, the LiDAR 330 may be rotated by a motor and may detect objects around the vehicle 100.

If the LiDAR 330 is implemented in a non-driven manner, the LiDAR 330 may detect objects located within a predetermined range from the vehicle 100 through optical steering. The vehicle 100 may include a plurality of non-driven-type LiDARs 330.

The LiDAR 330 may detect an object using laser light based on a ToF scheme or a phase-shift scheme, and may detect the location of the detected object, the distance to the detected object, and the relative speed with respect to the detected object.

The LiDAR 330 may be disposed at an appropriate position on the exterior of the vehicle in order to sense an object ahead of, behind, or beside the vehicle.

The ultrasonic sensor 340 may include an ultrasonic wave transmitter and an ultrasonic wave receiver. The ultrasonic sensor 340 may detect an object using ultrasonic waves, and may detect the location of the detected object, the distance to the detected object, and the relative speed with respect to the detected object.

The ultrasonic sensor 340 may be disposed at an appropriate position on the exterior of the vehicle in order to sense an object ahead of, behind, or beside the vehicle.

The infrared sensor 350 may include an infrared transmitter and an infrared receiver. The infrared sensor 340 may detect an object using infrared light, and may detect the location of the detected object, the distance to the detected object, and the relative speed with respect to the detected object.

The infrared sensor 350 may be disposed at an appropriate position on the exterior of the vehicle in order to sense an object ahead of, behind, or beside the vehicle.

The processor 370 may control the overall operation of each unit of the object detection device 300.

The processor 370 may compare data, sensed by the camera 310, the RADAR 320, the LiDAR 330, the ultrasonic sensor 340, and the infrared sensor 350, with prestored data, thereby detecting or classifying objects.

The processor 370 may detect an object and may track the detected object based on an acquired image. The processor 370 may perform operations including calculation of the distance to the object and calculation of the relative speed with respect to the object through an image-processing algorithm.

For example, the processor 370 may acquire information about the distance to the object and information about the relative speed with respect to the object in the acquired image based on variation in the size of the object over time.

For example, the processor 370 may acquire information about the distance to the object and information about the relative speed with respect to the object through a pin hole model, road surface profiling, or the like.

For example, the processor 370 may acquire information about the distance to the object and information about the relative speed with respect to the object based on disparity information in the stereo image acquired by the stereo camera 310*a*.

The processor 370 may detect an object and may track the detected object based on an electromagnetic wave that is transmitted, is reflected from the object, and then returns. The processor 370 may perform operations including calculation of the distance to the object and calculation of the relative speed with respect to the object based on the electromagnetic wave.

The processor 370 may detect an object and may track the detected object based on laser light that is transmitted, is reflected from the object, and then returns. The processor 370 may perform operations including calculation of the distance to the object and calculation of the relative speed with respect to the object based on the laser light.

The processor 370 may detect an object and may track the detected object based on an ultrasonic wave that is transmitted, is reflected from the object, and then returns. The processor 370 may perform operations including calculation of the distance to the object and calculation of the relative speed with respect to the object based on the ultrasonic wave.

The processor 370 may detect an object and may track the detected object based on infrared light that is transmitted, is reflected from the object, and then returns. The processor 370 may perform operations including calculation of the distance to the object and calculation of the relative speed with respect to the object based on the infrared light.

In some embodiments, the object detection device 300 may include a plurality of processors 370 or may not include a processor 370. For example, each of the camera 310, the RADAR 320, the LiDAR 330, the ultrasonic sensor 340, and the infrared sensor 350 may include an individual processor.

If the object detection device 300 does not include a processor 370, the object detection device 300 may operate under the control of a processor of a device in the vehicle 100, or under the control of the controller 170.

The object detection device 300 may operate under the control of the controller 170.

The communication device 400 is a device for communicating with an external device. Here, the external device may be another vehicle, a mobile terminal, or a server.

In order to realize communication, the communication device 400 may include at least one of a transmission antenna, a reception antenna, a Radio Frequency (RF) circuit capable of implementing various communication protocols, or an RF device.

The communication device 400 may include a short-range communication unit 410, a location information unit 420, a V2X communication unit 430, an optical communication unit 440, a broadcasting transceiver unit 450, an Intelligent Transport System (ITS) communication unit 460, and a processor 470.

In some embodiments, the communication device 400 may further include a new component in addition to the above-described components, or may not include some of the above-described components.

The short-range communication unit 410 is a unit for performing short-range communication. The short-range communication unit 410 may support short-range communication using at least one of Bluetooth™, Radio Frequency Identification (RFID), Infrared Data Association (IrDA), Ultra-Wideband (UWB), ZigBee, Near Field Communication (NFC), Wireless-Fidelity (Wi-Fi), Wi-Fi Direct, or Wireless Universal Serial Bus (Wireless USB).

The short-range communication unit 410 may conduct short-range communication between the vehicle 100 and at least one external device by establishing wireless area networks.

The location information unit 420 is a unit configured to acquire information about the location of the vehicle 100. For example, the location information unit 420 may include a Global Positioning System (GPS) module or a Differential Global Positioning System (DGPS) module.

The V2X communication unit 430 is a unit used for wireless communication with a server (Vehicle to Infrastructure (V2I)), another vehicle (Vehicle to Vehicle (V2V)), or a pedestrian (Vehicle to Pedestrian (V2P)). The V2X communication unit 430 may include an RF circuit capable of implementing a V2I protocol, a V2V protocol, and a V2P protocol.

The optical communication unit 440 is a unit used to communicate with an external device via light. The optical communication unit 440 may include an optical transmitter for converting an electrical signal into an optical signal and radiating the optical signal to the outside, and an optical receiver for converting a received optical signal into an electrical signal.

In some embodiments, the optical transmitter may be integrated with a lamp included in the vehicle 100.

The broadcasting transceiver unit 450 is a unit used to receive a broadcast signal from an external broadcasting management server or transmit a broadcast signal to the broadcasting management server through a broadcast channel. The broadcast channel may include a satellite channel and a terrestrial channel. The broadcast signal may include a TV broadcast signal, a radio broadcast signal, and a data broadcast signal.

The ITS communication unit 460 may exchange information, data, or signals with a traffic system. The ITS communication unit 460 may provide acquired information and data to the traffic system. The ITS communication unit 460 may receive information, data, or a signal from the traffic system. For example, the ITS communication unit 460 may receive traffic information from the traffic system and provide the received traffic information to the controller 170. For example, the ITS communication unit 460 may receive a control signal from the traffic system, and may provide the received control signal to the controller 170 or a processor in the vehicle 100.

The processor 470 may control the overall operation of each unit of the communication device 400.

In some embodiments, the communication device 400 may include a plurality of processors 470 or may not include a processor 470.

If the communication device 400 does not include a processor 470, the communication device 400 may operate under the control of a processor of another device in the vehicle 100, or under the control of the controller 170.

The communication device 400 may be configured as a vehicle display device, together with the user interface device 200. In this case, the vehicle display device may be referred to as a telematics device or an Audio Video Navigation (AVN) device.

The communication device 400 may operate under the control of the controller 170.

The driving operation device 500 is a device used to receive user input for driving the vehicle.

In the manual mode, the vehicle 100 may be driven based on a signal provided by the driving operation device 500.

The driving operation device 500 may include a steering input device 510, an acceleration input device 530, and a brake input device 570.

The steering input device 510 may receive user input for steering the vehicle 100. The steering input device 510 may be configured in the form of a wheel for enabling steering input by being rotated. In some embodiments, the steering input device may be configured as a touch screen, a touchpad, or a button.

The acceleration input device 530 may receive user input for acceleration of the vehicle 100. The brake input device 570 may receive user input for deceleration of the vehicle 100. The acceleration input device 530 and the brake input device 570 may be configured as pedals. In some embodiments, the acceleration input device or the brake input device may be configured as a touch screen, a touchpad, or a button.

The driving operation device 500 may operate under the control of the controller 170.

The vehicle driving device 600 is a device used to electrically control the operation of various devices in the vehicle 100.

The vehicle driving device 600 may include a powertrain driving unit 610, a chassis driving unit 620, a door/window driving unit 630, a safety device driving unit 640, a lamp driving unit 650, and an air-conditioner driving unit 660.

In some embodiments, the vehicle driving device 600 may further include a new component in addition to the above-described components, or may not include some of the above-described components.

The vehicle driving device 600 may include a processor. Each unit of the vehicle driving device 600 may include an individual processor.

The powertrain driving unit 610 may control the operation of a powertrain device.

The powertrain driving unit 610 may include a power source driving unit 611 and a transmission driving unit 612.

The power source driving unit 611 may control a power source of the vehicle 100.

For example, if the power source is a fossil fuel-based engine, the power source driving unit 611 may perform electronic control of the engine. Therefore, the power source driving unit 611 may control the output torque of the engine. The power source driving unit 611 may adjust the engine output torque under the control of the controller 170.

For example, if the power source is an electrical energy-based motor, the power source driving unit 611 may control the motor. The power source driving unit 611 may adjust the rotational speed, torque, and so on of the motor under the control of the controller 170.

The transmission driving unit 612 may control a transmission.

The transmission driving unit 612 may adjust the state of the transmission. The transmission driving unit 612 may switch the state of the transmission to a drive (D) mode, a reverse (R) mode, a neutral (N) mode, or a parking (P) mode.

If the power source is an engine, the transmission driving unit 612 may adjust the engagement state of a gear in the drive (D) mode.

The chassis driving unit 620 may control the operation of a chassis device.

The chassis driving unit 620 may include a steering driving unit 621, a brake driving unit 622, and a suspension driving unit 623.

The steering driving unit 621 may perform electronic control of a steering apparatus in the vehicle 100. The steering driving unit 621 may change the driving direction of the vehicle.

The brake driving unit 622 may perform electronic control of a brake apparatus in the vehicle 100. For example, the brake driving unit 622 may decrease the speed of the vehicle 100 by controlling the operation of a brake disposed at a wheel.

The brake driving unit 622 may control a plurality of brakes individually. The brake driving unit 622 may independently control the braking power applied to each of a plurality of wheels.

The suspension driving unit 623 may perform electronic control of a suspension apparatus in the vehicle 100. For example, if a road is bumpy, the suspension driving unit 623 may control the suspension apparatus to reduce the vibration of the vehicle 100.

The suspension driving unit 623 may control a plurality of suspensions individually.

The door/window driving unit 630 may perform electronic control of a door apparatus or a window apparatus in the vehicle 100.

The door/window driving unit 630 may include a door driving unit 631 and a window driving unit 632.

The door driving unit 631 may perform control of a door apparatus. The door driving unit 631 may control the opening or closing of a plurality of doors in the vehicle 100. The door driving unit 631 may control the opening or closing of the trunk or the tailgate. The door driving unit 631 may control the opening or closing of the sunroof.

The window driving unit 632 may perform electronic control of a window apparatus. The window driving unit 632 may control the opening or closing of a plurality of windows in the vehicle 100.

The safety device driving unit 640 may perform electronic control of various safety apparatuses in the vehicle 100.

The safety device driving unit 640 may include an airbag driving unit 641, a seatbelt driving unit 642, and a pedestrian protection device driving unit 643.

The airbag driving unit 641 may perform electronic control of an airbag apparatus in the vehicle 100. For example, the airbag driving unit 641 may control the inflation of an airbag upon sensing an emergency situation.

The seatbelt driving unit 642 may perform electronic control of a seatbelt apparatus in the vehicle 100. For example, the seatbelt driving unit 642 may control securing of passengers on the seats 110FL, 110FR, 110RL and 110RR using seatbelts upon sensing an emergency situation.

The pedestrian protection device driving unit 643 may perform electronic control of a hood lift and a pedestrian airbag. For example, the pedestrian protection device driving unit 643 may control hood lift-up and inflation of the pedestrian airbag upon sensing a collision with a pedestrian.

The lamp driving unit 650 may perform electronic control of various lamp apparatuses in the vehicle 100.

The air-conditioner driving unit 660 may perform electronic control of an air-conditioner in the vehicle 100. For example, if a vehicle internal temperature is high, the air-conditioner driving unit 660 may control the air-conditioner to operate and supply cool air into the vehicle.

The vehicle driving device 600 may include a processor. Each unit of the vehicle driving device 600 may include an individual processor.

The vehicle driving device 600 may operate under the control of the controller 170.

The operation system 700 is a system that controls various operations of the vehicle 100. The operation system 700 may operate in the autonomous driving mode.

The operation system 700 may include a driving system 710, a park-out system 740, and a park-in system 750.

In some embodiments, the operation system 700 may further include a new component in addition to the above-described components, or may not include some of the above-described components.

The operation system 700 may include a processor. Each unit of the operation system 700 may include an individual processor.

In some embodiments, if the operation system 700 is implemented in software, the operation system 700 may be configured as a lower-level component of the controller 170.

In some embodiments, the operation system 700 may conceptually include at least one of the user interface device 270, the object detection device 300, the communication device 400, the driving operation device 500, the vehicle driving device 600, the navigation system 770, the sensing unit 120, or the controller 170.

The driving system 710 may perform driving of the vehicle 100.

The driving system 710 may perform driving of the vehicle 100 by receiving navigation information from the navigation system 770 and providing a control signal to the vehicle driving device 600.

The driving system 710 may perform driving of the vehicle 100 by receiving object information from the object detection device 300 and providing a control signal to the vehicle driving device 600.

The driving system 710 may perform driving of the vehicle 100 by receiving a signal from an external device through the communication device 400 and providing a control signal to the vehicle driving device 600.

The driving system 710 may conceptually include at least one of the user interface device 270, the object detection device 300, the communication device 400, the driving operation device 500, the vehicle driving device 600, the navigation system 770, the sensing unit 120, or the controller 170, and may perform driving of the vehicle 100.

The driving system 710 may be referred to as a vehicle driving control device.

The park-out system 740 may perform park-out of the vehicle 100.

The park-out system 740 may perform park-out of the vehicle 100 by receiving navigation information from the navigation system 770 and providing a control signal to the vehicle driving device 600.

The park-out system 740 may perform park-out of the vehicle 100 by receiving object information from the object detection device 300 and providing a control signal to the vehicle driving device 600.

The park-out system 740 may perform park-out of the vehicle 100 by receiving a signal from an external device through the communication device 400 and providing a control signal to the vehicle driving device 600.

The park-out system 740 may conceptually include at least one of the user interface device 270, the object detection device 300, the communication device 400, the driving operation device 500, the vehicle driving device 600, the navigation system 770, the sensing unit 120, or the controller 170, and may perform park-out of the vehicle 100.

The park-out system 740 may be referred to as a vehicle park-out control device.

The park-in system 750 may perform park-in of the vehicle 100.

The park-in system 750 may perform park-in of the vehicle 100 by receiving navigation information from the navigation system 770 and providing a control signal to the vehicle driving device 600.

The park-in system 750 may perform park-in of the vehicle 100 by receiving object information from the object detection device 300 and providing a control signal to the vehicle driving device 600.

The park-in system 750 may perform park-in of the vehicle 100 by receiving a signal from an external device through the communication device 400 and providing a control signal to the vehicle driving device 600.

The park-in system 750 may conceptually include at least one of the user interface device 270, the object detection device 300, the communication device 400, the driving operation device 500, the vehicle driving device 600, the navigation system 770, the sensing unit 120, or the controller 170, and may perform park-in of the vehicle 100.

The park-in system 750 may be referred to as a vehicle park-in control device.

The navigation system 770 may provide navigation information. The navigation information may include at least one of map information, set destination information, path information according to the destination setting, information about various objects on a path, lane information, or information about the current location of a vehicle.

The navigation system 770 may include a memory and a processor. The memory may store navigation information. The processor may control the operation of the navigation system 770.

In some embodiments, the navigation system 770 may receive information from an external device through the communication device 400, and may update pre-stored information using the received information.

In some embodiments, the navigation system 770 may be classified as a lower-level component of the user interface device 200.

The sensing unit 120 may sense the state of the vehicle. The sensing unit 120 may include an inertial navigation unit (IMU) sensor, a collision sensor, a wheel sensor, a speed sensor, an inclination sensor, a weight detection sensor, a heading sensor, a position module, a vehicle forward/reverse movement sensor, a battery sensor, a fuel sensor, a tire sensor, a steering sensor for detecting rotation of the steering wheel, a vehicle internal temperature sensor, a vehicle internal humidity sensor, an ultrasonic sensor, an illuminance sensor, an accelerator pedal position sensor, a brake pedal position sensor, and so on.

The inertial navigation unit (IMU) sensor may include at least one of an acceleration sensor, a gyro sensor, or a magnetic sensor.

The sensing unit 120 may acquire sensing signals of vehicle attitude information, vehicle motion information, vehicle yaw information, vehicle roll information, vehicle pitch information, vehicle collision information, vehicle heading information, vehicle location information (GPS information), vehicle angle information, vehicle speed information, vehicle acceleration information, vehicle inclination information, vehicle forward/reverse movement information, battery information, fuel information, tire information, vehicle lamp information, vehicle internal temperature information, vehicle internal humidity information, a steering wheel rotation angle, vehicle external illuminance, the pressure applied to the accelerator pedal, the pressure applied to the brake pedal, and so on.

The sensing unit 120 may further include an accelerator pedal sensor, a pressure sensor, an engine speed sensor, an air flow sensor (AFS), an air temperature sensor (ATS), a water temperature sensor (WTS), a throttle position sensor (TPS), a top dead center (TDC) sensor, a crank angle sensor (CAS), and so on.

The sensing unit 120 may generate vehicle state information based on the sensing data. The vehicle state information may be generated based on data detected by various sensors included in the vehicle.

For example, the vehicle state information may include vehicle attitude information, vehicle speed information, vehicle inclination information, vehicle weight information, vehicle heading information, vehicle battery information, vehicle fuel information, vehicle tire air pressure information, vehicle steering information, vehicle internal temperature information, vehicle internal humidity information, pedal position information, vehicle engine temperature information, and so on.

The interface unit 130 may serve paths to various types of external devices connected to the vehicle 100. For example, the interface unit 130 may be provided with a port connectable to a mobile terminal, and may be connected to a mobile terminal through the port. In this case, the interface unit 130 may exchange data with the mobile terminal.

The interface unit 130 may serve as a path through which electrical energy is supplied to a connected mobile terminal. If the mobile terminal is electrically connected to the interface unit 130, the interface unit 130 may supply electrical energy received from the power supply unit 190 to the mobile terminal under the control of the controller 170.

The memory 140 is electrically connected to the controller 170. The memory 140 may store basic data for a unit, control data for controlling operation of the unit, and input and output data. The memory 140 may be any of various storage devices realized in hardware, such as Read Only Memory (ROM), Random Access Memory (RAM), Erasable and Programmable ROM (EPROM), a flash drive, and a hard drive. The memory 140 may store various data for the overall operation of the vehicle 100, such as programs for performing processing or controlling by the controller 170.

In some embodiments, the memory 140 may be integrated with the controller 170 or may be configured as a lower-level component of the controller 170.

The controller 170 may control the overall operation of each unit in the vehicle 100. The controller 170 may be referred to as an Electronic Control Unit (ECU).

The power supply unit 190 may supply power needed for operating each component under the control of the controller 170. Particularly, the power supply unit 190 may receive power from a battery in the vehicle.

One or more processors and the controller 170 included in the vehicle 100 may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, or an electrical unit for executing other functions.

Figure 8A:
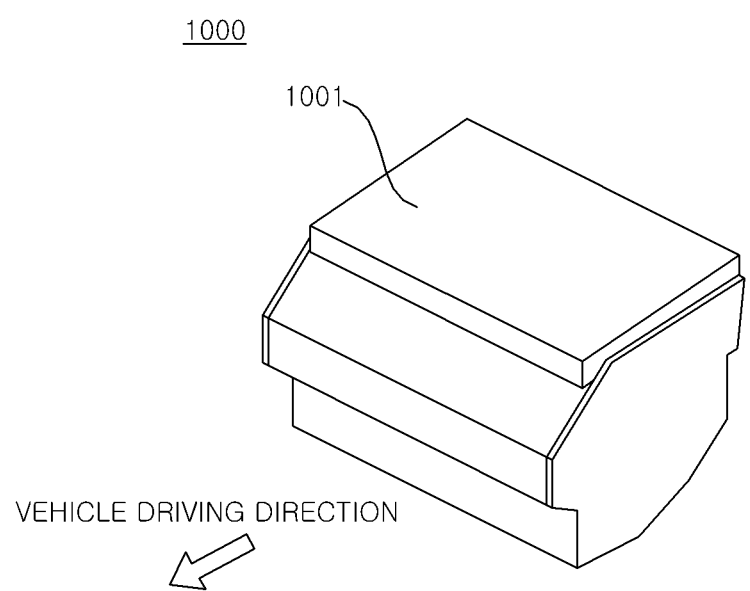
FIG. 8A is a view illustrating the external appearance of a head-up display device according to an embodiment of the present invention.
Figure 8B:
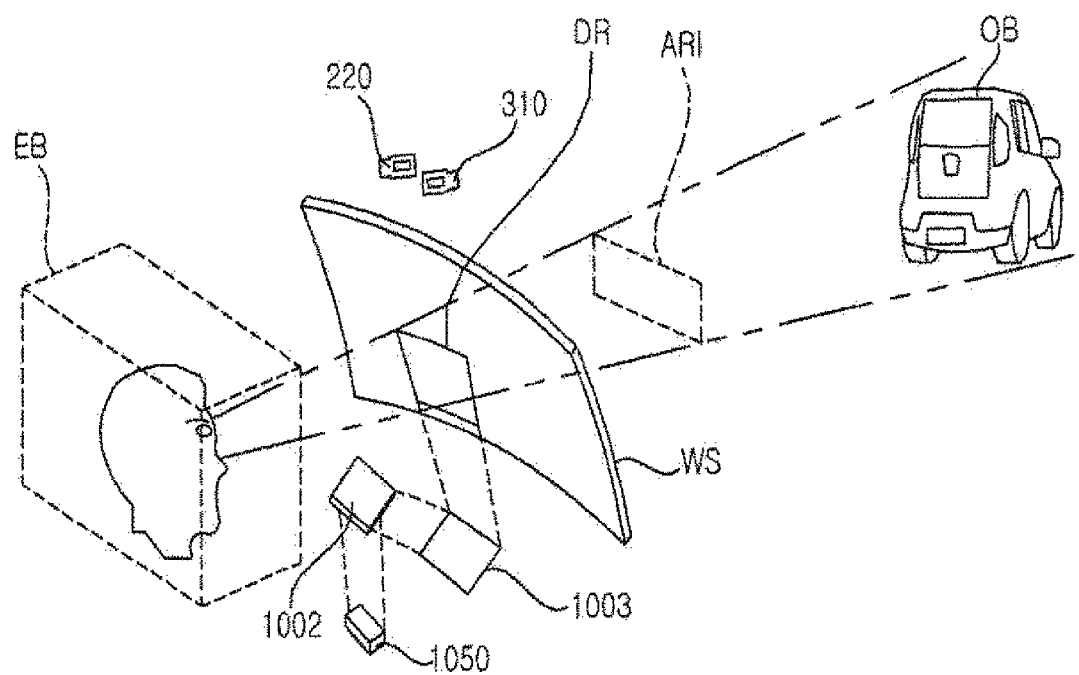
FIG. 8B is a conceptual view to be referred to for explaining the head-up display device according to the embodiment of the present invention.

FIG. 8A is a view illustrating the external appearance of a head-up display device according to an embodiment of the present invention, and FIG. 8B is a conceptual view to be referred to for explaining the head-up display according to the embodiment of the present invention.

Referring to the drawings, a vehicular head-up display device 1000 (hereinafter, a head-up display device) may be disposed inside the vehicle 100, and may provide generated information to a user.

The head-up display device 1000 may be disposed inside a cockpit module or may be disposed on a dashboard. The head-up display device 1000 may include a cover 1001, which is configured to be opened and closed in accordance with user input.

The head-up display device 1000 may generate a graphic object using at least one light source 1052 and a liquid crystal display 1055. The generated graphic object may be projected and displayed on a screen. The screen may be implemented as any one of a windshield WS and a combiner. In the case in which the screen is implemented as a combiner, the head-up display device 1000 may further include a combiner.

The head-up display device 1000 may include an image generation unit 1050 and at least one mirror.

The image generation unit 1050 may include a backlight unit 1051, thereby projecting display light for forming an augmented-reality image onto the screen under the control of a processor 1070. The display light generated by the image generation unit 1050 may be reflected by the at least one mirror 1002 and 1003, and may be provided to the screen.

The at least one mirror 1002 and 1003 may generate an optical path from the image generation unit 1050 to the windshield WS.

Due to the optical path, the size of the display light, which corresponds to the augmented-reality image, may be adjusted, or the position at which the display light is projected on the windshield WS may be adjusted so as to adjust a focal point.

Meanwhile, the display light reflected by the at least one mirror 1002 and 1003 may be projected within a predetermined region (hereinafter, a display region) in the windshield WS. A reflective film may be attached to the display region DR so that an augmented-reality image ARI can be seen more clearly.

The head-up display device 1000 may provide an indicator image.

The processor 1070 may receive data for generating an indicator image from other electronic devices in the vehicle.

The processor 1070 may generate a control signal for generating an indicator image based on the received data, and may provide the generated control signal to the image generation unit 1050.

The head-up display device 1000 may also provide an augmented-reality image.

The processor 1070 may receive data for generating an augmented-reality image from other electronic devices in the vehicle.

The processor 1070 may provide a control signal for generating an augmented-reality image to the image generation unit 1050 based on the received data.

In some embodiments, the image generation unit 1050 may include a light source for generating an indicator image and a light source for generating an augmented-reality image, which are provided separately from each other.

An augmented-reality image is realized by the display light projected onto the screen. At a driver's position, an augmented-reality image ARI may be seen as being displayed not on the display region DR of the windshield WS but outside the vehicle 100, beyond the display region DR.

The augmented-reality image ARI may be recognized as a virtual image that is floating a predetermined distance ahead of the vehicle 100. For example, the augmented-reality image ARI may be a graphic object that provides information about an outline of an object OB, a speed, a collision alert, etc.

In the case in which the head-up display device 1000 realizes the augmented-reality image ARI using a virtual image, the driver's eyes need to be positioned within an eye box EB so that the driver perceives the augmented-reality image ARI through the display region DR.

The eye box EB is an indoor space having a three-dimensional volume in the vehicle 100. When the driver's eyes are positioned within the eye box EB, the driver is able to perceive the augmented-reality image ARI through the display region DR.

On the other hand, when the driver's eyes are out of the eye box EB, the driver may see only a part of the augmented-reality image ARI, or none thereof. The coordinates defining the boundary of the eye box EB may be stored in advance in a memory 640.

Meanwhile, when the driver's eyes are positioned within the eye box EB, the driver may perceive the augmented-reality image ARI. However, there may be an error between the actual image of the object OB and the augmented-reality image ARI, which are perceived by the driver through the display region DR, depending on a change in the position of the eyes within the eye box EB.

This phenomenon occurs because the distance to the augmented-reality image ARI and the distance to the object OB are different with respect to the driver's position. When the distance to the object OB increases, the error between the object OB and the augmented-reality image ARI may gradually increase. In order to reduce or remove such an error, the processor 1070 may perform postprocessing on the augmented-reality image ARI based on the position of the eyes of the driver.

Specifically, the processor 1070 may detect the position of the eyes of the driver from an image of the driver provided from the internal camera 220. In one embodiment, the processor 1070 may detect the driver's eyes appearing in the image of the driver using eye tracking technology, and may calculate the three-dimensional coordinates of the detected eyes. In another embodiment, the processor 1070 may extract the outline of the driver's face from the image of the driver using edge detection technology, and may estimate the position of the driver's eyes based on the extracted outline.

Information about a reference position may be preset in the memory 640. The processor 1070 may compare the position of the driver's eyes with the reference position, and may calculate the direction in which the eyes are positioned and the distance to the eyes with respect to the reference position. That is, the processor 1070 may determine the distance from the reference position to the current position of the driver's eyes and the direction in which the driver's eyes are positioned.

The processor 1070 may determine a visual effect to be applied to postprocessing of an augmented-reality image, depending on the direction in which the eyes are positioned and the distance to the eyes with respect to the reference position. In addition, the processor 1070 may determine the size of the determined visual effect.

The processor 1070 may perform postprocessing on the augmented-reality image ARI using the determined visual effect, thereby minimizing an error between the augmented-reality image and the actual image of the object OB due to a change in the position of the eyes within the eye box EB and providing a more improved image-matching result to the driver.

A visual effect applicable to postprocessing of the augmented-reality image may include at least one of blurring the augmented-reality image, changing the position of the augmented-reality image, changing the size of the augmented-reality image, changing the shape of the augmented-reality image, or changing the tilt of the augmented-reality image. For example, when a horizontal error between the augmented-reality image and the actual image of the object occurs due to a change in the position of the driver's eyes from side to side along the y axis, the processor 1070 may horizontally move the augmented-reality image toward the actual image or may compensate for the difference between the two images using a visual effect such as increasing the width of the augmented-reality image or blurring at least a portion of the augmented-reality image.

Figure 8C:
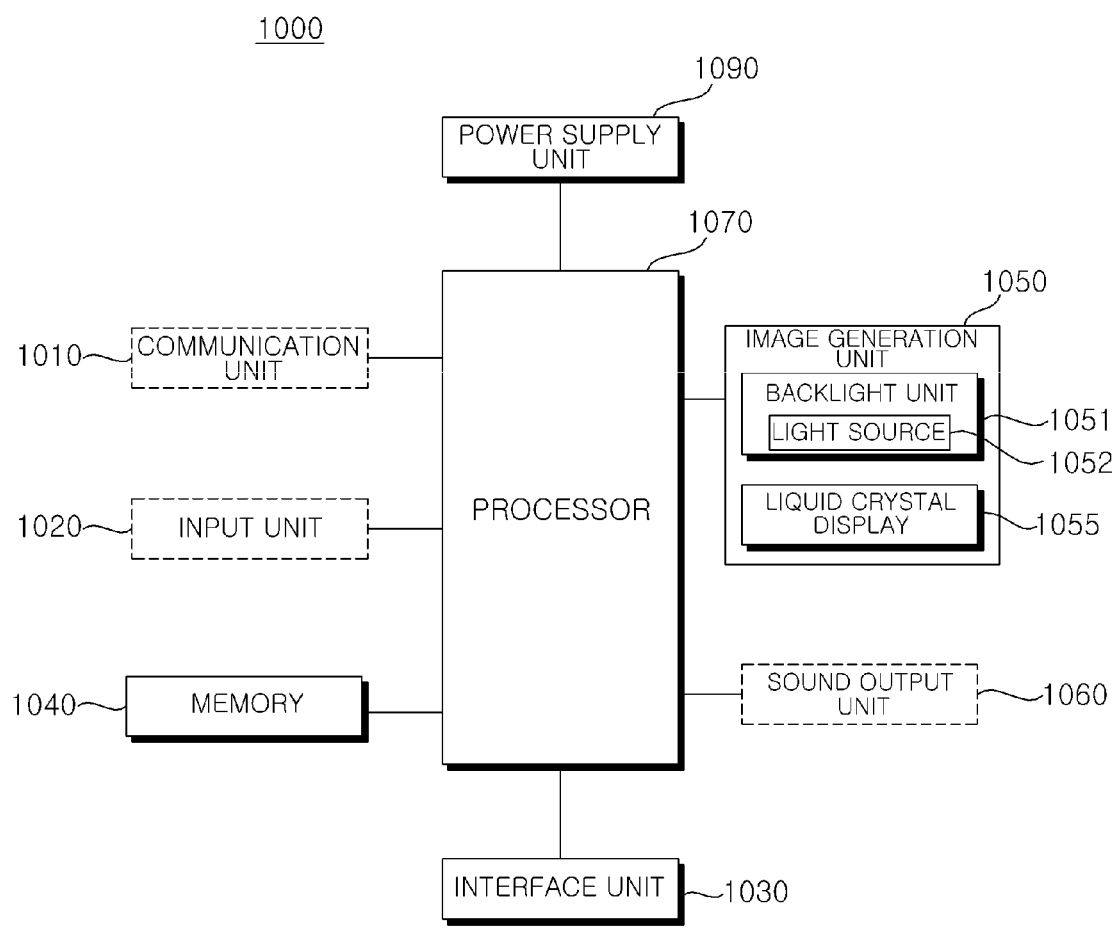
FIG. 8C is a control block diagram of the head-up display device according to the embodiment of the present invention.

FIG. 8C is a block diagram of the head-up display device according to the embodiment of the present invention.

Referring to FIG. 8C, the head-up display device 1000 may be conceptually included in the user interface device 200.

The head-up display device 1000 may include an interface unit 1030, a memory 1040, an image generation unit 1050, a processor 1070, and a power supply unit 1090.

In some embodiments, the head-up display device 1000 may further include a communication unit 1010, an input unit 1020, and a sound output unit 1060 in a separate form or in a combined form.

The communication unit 1010 may include at least one communication module that enables wireless communication between the head-up display device 1000 and a mobile terminal, between the head-up display device 600 and an external server, or between the head-up display device 1000 and another vehicle.

For example, the communication unit 1010 may form a communication channel with a user's mobile terminal through a short-range communication module and thus may display information received from the mobile terminal.

The input unit 1020 may receive information from a user. Data collected by the input unit 1020 may be analyzed by the processor 1070, and may be recognized as a control command from the user.

Meanwhile, the input unit 210, the internal camera 220, and the camera 310, which are included in the vehicle 100, may be classified as lower-level components of the head-up display device 1000. Specifically, the input unit 1020 may include the voice input unit 211, the gesture input unit 212, the touch input unit 213, the mechanical input unit 214, and the internal camera 220.

The interface unit 1030 may receive data, information, and a signal from the electronic device in the vehicle 100.

The interface unit 1030 may transmit data, information, and a signal, which are processed or generated by the processor 1070, to the electronic device in the vehicle 100.

To this end, the interface unit 1030 may include at least one of a circuit, an element, or a port to communicate with the electronic device in the vehicle 100 in a wired or wireless manner.

Meanwhile, the interface unit 1030 may receive driving condition information.

The memory 1040 is electrically connected to the processor 1070. The memory 1040 may store basic data for each unit of the head-up display device 1000, control data for controlling the operation of each unit, and data that are input and output.

The memory 1040 may be any of various hardware storage devices, such as a ROM, a RAM, an EPROM, a flash drive, and a hard drive. The memory 1040 may store various data for the overall operation of the head-up display device 1000, such as programs for processing or control of the processor 1070.

In some embodiments, the memory 1040 may be integrally formed with the processor 1070.

Under the control of the processor 1070, the image generation unit 1050 may output display light generated based on data provided from the processor 1070.

The image generation unit 1050 may include a backlight unit 1051 and a liquid crystal display 1055.

The backlight unit 1051 may include at least one light source 1052. For example, the backlight unit 1051 may include at least one light-emitting diode (LED) as the light source 1052.

The at least one light source 1052 may convert electrical energy into optical energy.

The at least one light source 1052 may output unpolarized light based on the electrical energy supplied from the power supply unit 1090.

In some embodiments, the at least one light source 1052 may include a first light source 1052a for outputting first light and a second light source 1052b for outputting second light.

The liquid crystal display (LCD) 1055 may emit display light based on the light provided from the at least one light source. The display light may be projected onto the screen to form an image.

The liquid crystal display 1055 may emit linearly polarized light as the display light.

For example, the liquid crystal display 1055 may emit, based on first linearly polarized light introduced in a first direction, second linearly polarized light as the display light in a second direction. Here, the second direction may be a direction perpendicular to the first direction.

In some embodiments, the image generation unit 1050 may further include at least one mirror.

The at least one mirror may be disposed between the backlight unit 1051 and the liquid crystal display 1055.

The at least one mirror may generate an optical path from the backlight unit 1051 to the liquid crystal display 1055.

Due to the generated optical path, the size of the light generated by the backlight unit 1051 may be adjusted, or the optical focal length may be adjusted.

The sound output unit 1060 may convert an electrical signal from the processor 1070 into an audio signal and may output the audio signal. To this end, the sound output unit 1060 may include at least one speaker.

The processor 1070 may control the overall operation of each unit of the head-up display device 1000.

The processor 1070 may control the image generation unit 1050.

The processor 1070 may control the at least one light source 1052.

The processor 1070 may control the turning on and off of each of the at least one light source 1052. The processor 1070 may control the light output of each of the at least one light source 1052.

The processor 1070 may control the light output of the first light source 1052a and the light output of the second light source 1052b differently.

The processor 1070 may control the first light source 1052a and the second light source 1052b to be turned on individually or simultaneously.

The processor 1070 may control the liquid crystal display 1055.

The processor 1070 may control the arrangement of liquid crystal molecules using an electrical signal.

The processor 1070 may control the light output of the light source 1052, and may control the liquid crystal display 1055 to adjust the arrangement of the liquid crystal molecules disposed in the first region, thereby controlling the brightness of an image displayed on the screen.

The processor 1070 may control the first light source 1052a and the liquid crystal display 1055 such that a first image corresponding to first information is displayed in the first region. Here, the first image may be an indicator image.

The processor 1070 may control the second light source 1052b and the liquid crystal display 1055 such that a second image corresponding to second information is displayed in the second region. Here, the second image may be an augmented-reality image.

The processor 1070 may control the at least one light source 1052 and the liquid crystal display 1055 in response to ambient illuminance information.

For example, in the state in which an image is being displayed, when ambient illuminance increases, the processor 1070 may increase the amount of current introduced into the light source 1052 such that the image is displayed more brightly.

The processor 1070 may control the at least one light source 1052 and the liquid crystal display 1055 in response to ambient illuminance information such that the scale of the displayed image is adjusted.

For example, in the state in which an image is being displayed, when ambient illuminance increases, the processor 1070 may control the liquid crystal display 1055 such that the image is displayed in a smaller size.

The processor 1070 may receive at least one of driving speed information of the vehicle 100, external object information, navigation information, or information about a user's mobile terminal through the interface unit 1030.

The processor 1070 may determine an image to be displayed in a specific region of the liquid crystal display 1055 based on at least one of the driving speed information, the external object information, the navigation information, or the mobile terminal information.

The processor 1070 may control the image generation unit 1050 such that display light corresponding to an image is output in the determined region.

The power supply unit 1090 may receive power from a battery or the like in the vehicle 100.

The power supply unit 1090 may supply power to each unit of the head-up display device 1000 under the control of the processor 1070.

The power supply unit 1090 may provide electrical energy for operating the processor 1070 to the processor 1070.

The power supply unit 1090 may provide electrical energy for operating the image generation unit 1050 to the image generation unit 1050.

Figure 9:
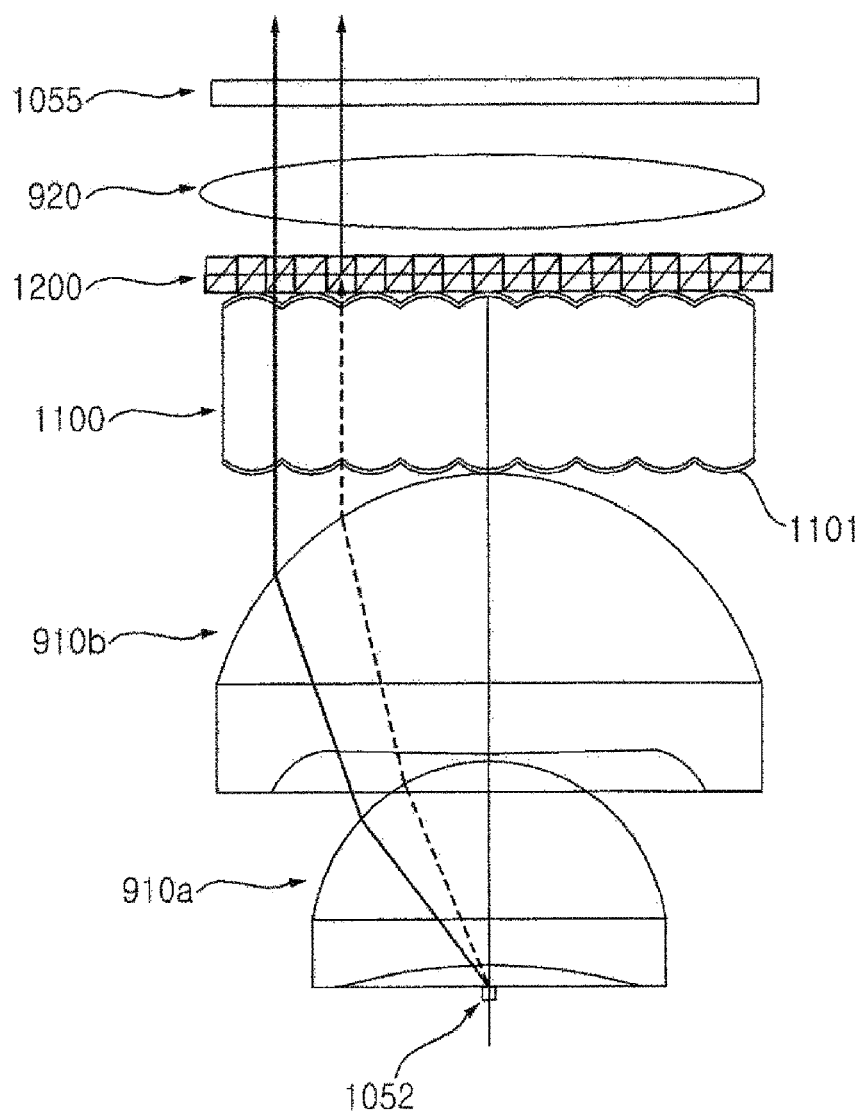
FIG. 9 is a view to be referred to for explaining an image generation unit of the head-up display device according to the embodiment of the present invention.

FIG. 9 is a view to be referred to for explaining the image generation unit of the head-up display device according to the embodiment of the present invention.

Figure 10:
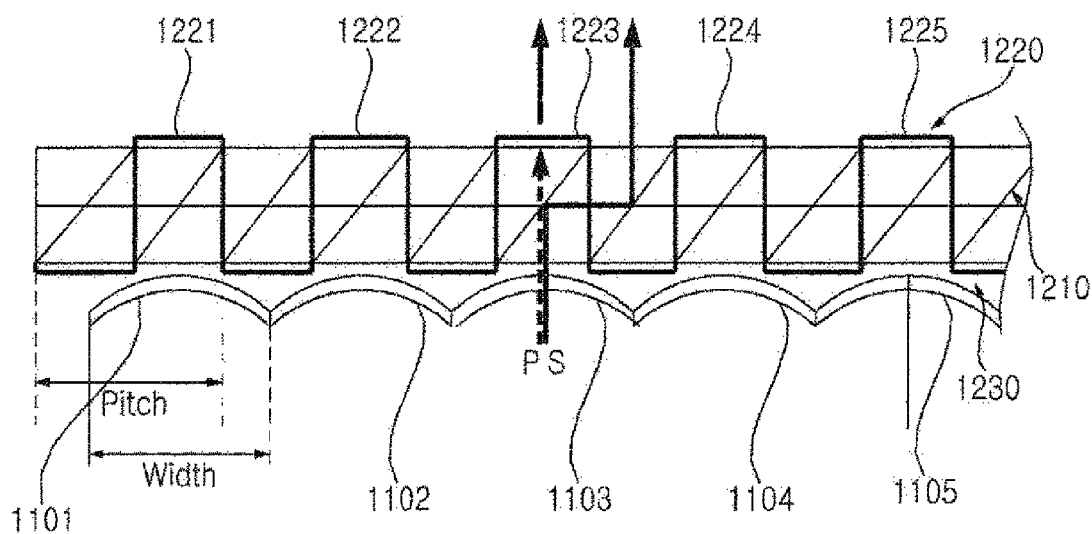
FIGS. 10 to 11B are views to be referred to for explaining a polarization converter according to an embodiment of the present invention.
Figure 11A:
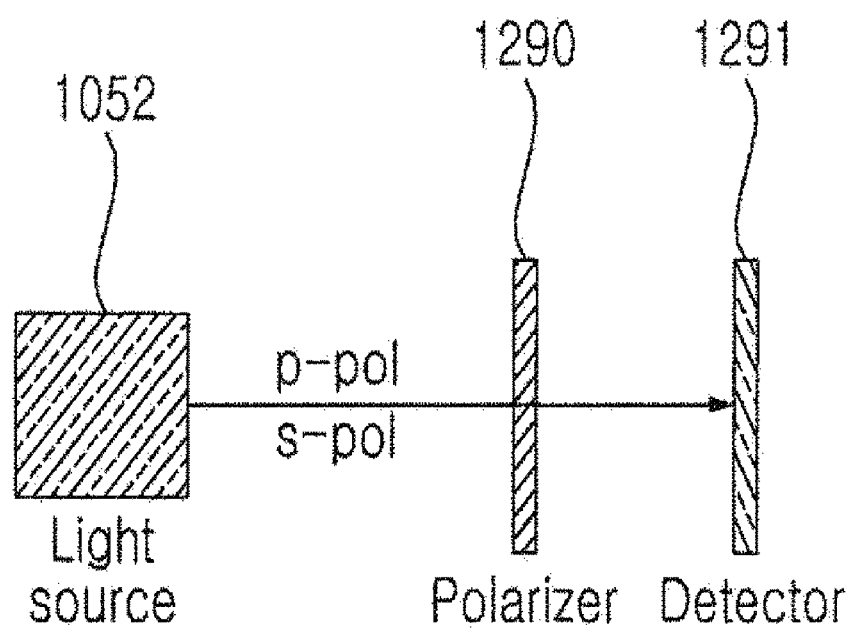
Figure 11B:
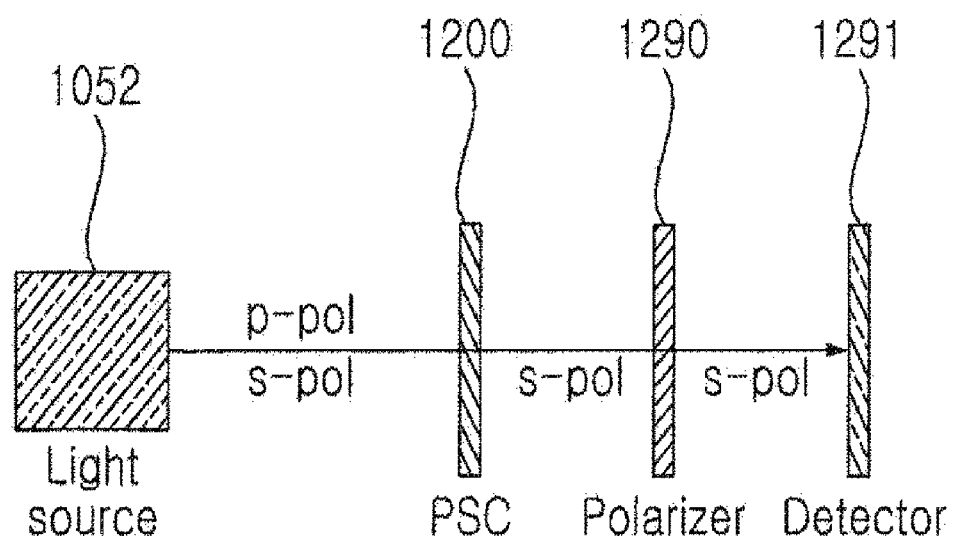

FIGS. 10 to 11B are views to be referred to for explaining a polarization converter according to an embodiment of the present invention.

Referring to FIGS. 9 to 11B, the image generation unit 1050, as described above, may include the backlight unit 1051 and the liquid crystal display 1055.

The image generation unit 1050 may further include at least one collimation lens 910, at least one fly eye lens (FEL) 1100, at least one polarization converter 1200, and at least one illumination lens 920 in a separate form or in a form in which two or more components are combined.

The collimation lens 910 may be disposed between the backlight unit 1051 and the FEL 1110.

The collimation lens 910 may be disposed between the light source 1052 and the FEL 1110.

The collimation lens 910 may make light beams output from the light source 1052 travel parallel to each other. The light beams that have passed through the collimation lens 910 may have an irregular distribution.

The collimation lens 910 may be provided in a plural number.

In one example, the collimation lens 910 may include a first collimation lens 910a and a second collimation lens 910b.

The FEL 1100 may be disposed between the backlight unit 1051 and the liquid crystal display 1055.

The FEL 1100 may be disposed between the light source 1052 and the liquid crystal display 1055.

The FEL 1100 may be disposed between the light source 1052 and the polarization converter 1200.

One surface of the FEL 1100 may face the collimation lens 910. The opposite surface of the FEL 1100 may face the polarization converter 1200.

The FEL 1100 may have an optic pattern.

The FEL 1110 may include a plurality of cells 1101, and may expand each of the light beams provided from the light source 1052 to at least some of the plurality of cells 1101 to a uniform size, thereby providing uniform light beams.

The FEL 1110 splits the light incident thereon through the plurality of cells 1101, and expands each of the split light beams to a uniform size, thereby emitting uniform light beams.

The respective cells 1101 may provide uniform light beams, each of which has passed through a respective one of the plurality of cells 1101, to uniform-sized areas (or regions) of the liquid crystal display 1055.

The polarization converter 1200 may be disposed between the backlight unit 1051 and the liquid crystal display 1055.

The polarization converter 1200 may be disposed between the light source 1052 and the liquid crystal display 1055.

The polarization converter 1200 may be disposed between the FEL 1100 and the illumination lens 920.

One surface of the polarization converter 1200 may face the FEL 1100. The opposite surface of the polarization converter 1200 may face the illumination lens 920.

The polarization converter 1200 may convert unpolarized light generated by the light source 1052 into single linearly polarized light.

The polarization converter 1200 may provide the converted single linearly polarized light to the liquid crystal display 1055.

Referring to FIG. 10, the polarization converter 1200 may include a polarizer beam splitter (PBS) 1210 and a half-wave plate (HWP) 1220.

The polarizer beam splitter 1210 may split unpolarized light generated by the light source 1052 into first linearly polarized light and second linearly polarized light.

The first linearly polarized light may be linearly polarized light in the first direction. The second linearly polarized light may be linearly polarized light in the second direction, which is perpendicular to the first direction.

In one example, the first linearly polarized light may be P-wave linearly polarized light, and the second linearly polarized light may be S-wave linearly polarized light.

In another example, the first linearly polarized light may be S-wave linearly polarized light, and the second linearly polarized light may be P-wave linearly polarized light.

The half-wave plate 1220 may convert the second linearly polarized light split by the polarizer beam splitter 1210 into first linearly polarized light.

In one example, the half-wave plate 1220 may convert P-wave linearly polarized light into S-wave linearly polarized light.

In another example, the half-wave plate 1220 may convert S-wave linearly polarized light into P-wave linearly polarized light.

The half-wave plate 1220 may include a plurality of converting portions 1221, 1222, 1223, 1224 and 1225.

The FEL 1100 may include a plurality of cells 1101, 1102, 1103, 1104 and 1105.

The pitch of the half-wave plate 1220 may be equal to the width of any one of the plurality of cells of the FEL 1100.

The pitch of the half-wave plate 1220 may be defined as the length from one end of the converting portion 1221 to the next converting portion 1222.

The plurality of converting portions 1221, 1222, 1223, 1224 and 1225 of the half-wave plate 1220 may be disposed at positions corresponding to the positions of the plurality of cells 1101, 1102, 1103, 1104 and 1105 of the FEL 1100.

For example, the center of the first converting portion 1221 may be disposed so as to be aligned with the center of the first cell 1101, and the center of the second converting portion 1222 may be disposed so as to be aligned with the center of the second cell 1102.

The polarization converter 1200 may further include an absorber 1230.

The absorber 1230 may absorb light that leaks. The absorber 1230 may absorb light that is not introduced into the polarizer beam splitter 1210.

As illustrated in FIGS. 11A and 11B, the optical efficiency of the configuration including the polarization converter 1200 (FIG. 11B) is increased by about 40% in comparison with the optical efficiency of the configuration not including a polarization converter (FIG. 11A).

Here, the optical efficiency may be defined as a value obtained by dividing the quantity of light detected by the detector 1291 by the power provided to the light source 1052.

The image generation unit 1050 may further include at least one mirror.

The at least one mirror may be disposed between the light source 1052 and the liquid crystal display 1055.

In one example, the at least one mirror may be disposed between the illumination lens 920 and the liquid crystal display 1055.

The at least one mirror included in the image generation unit 1050 may form an optical path to adjust the size of light and the focal length.

The illumination lens 920 may be disposed between the polarization converter 1200 and the liquid crystal display 1055.

One surface of the illumination lens 920 may face the polarization converter 1200. The opposite surface of the illumination lens 920 may face the liquid crystal display 1055.

In some embodiments, when a mirror is disposed between the illumination lens 920 and the liquid crystal display 1055, the opposite surface of the illumination lens 920 may face the liquid crystal display 1055.

The illumination lens 920 may focus the light incident thereon on the liquid crystal display 1055.

The illumination lens 920 may be provided in a plural number.

For example, the illumination lens 920 may include a first illumination lens and a second illumination lens.

The first illumination lens may focus the light dispersed through the FEL 1110 on the second illumination lens.

The second illumination lens may focus light beams having different angles of incidence on the liquid crystal display 1055.

Figure 12A:
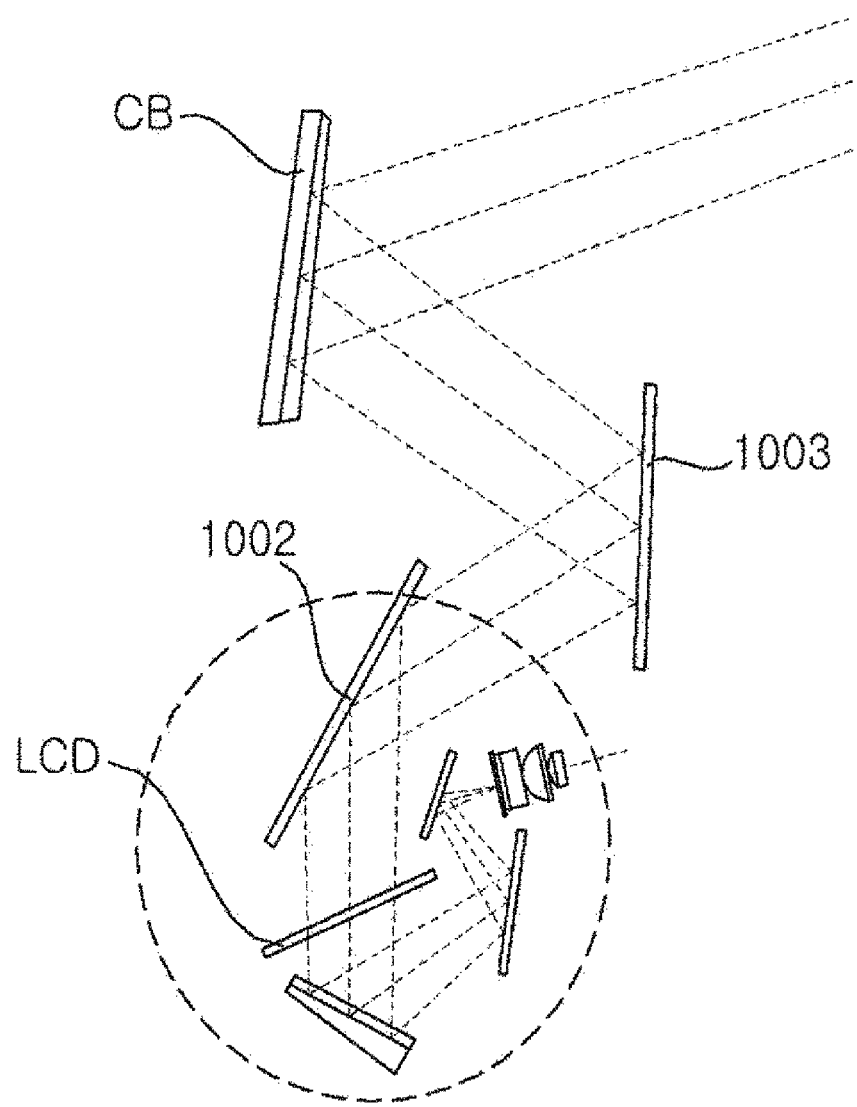
FIGS. 12A and 12B are views to be referred to for explaining the head-up display device according to the embodiment of the present invention.
Figure 12B:
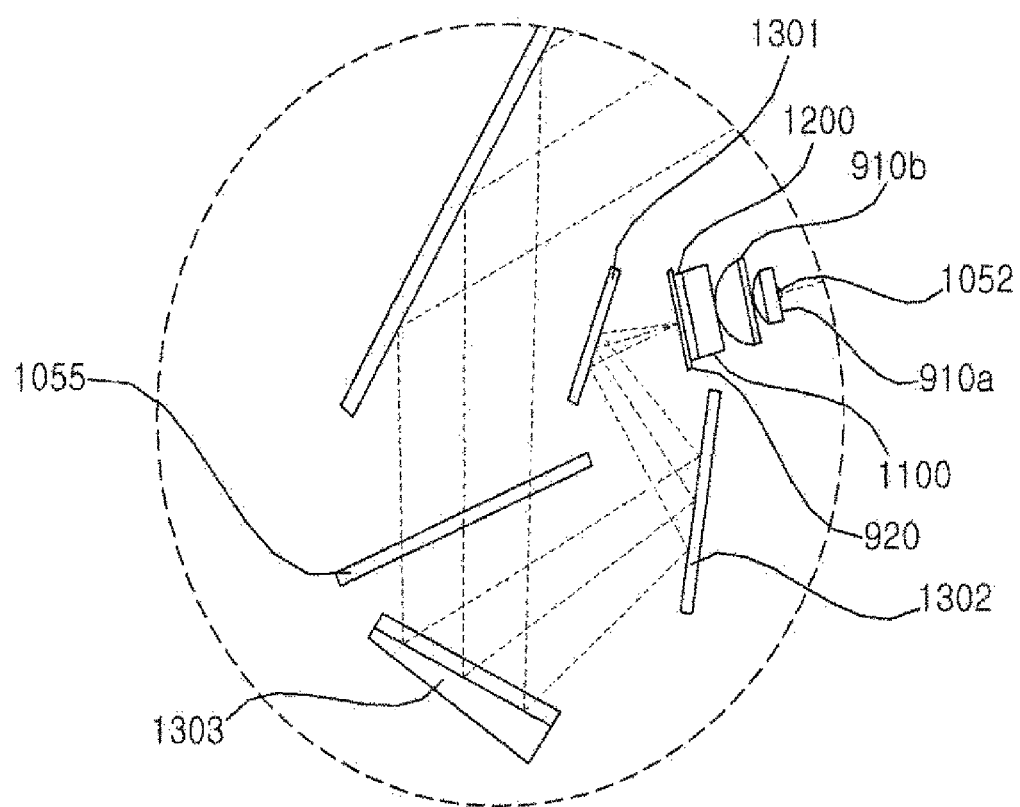

FIGS. 12A and 12B are views to be referred to for explaining the head-up display device according to the embodiment of the present invention.

Referring to FIGS. 12A and 12B, the head-up display device 1000 may include a light source 1052, a first collimation lens 910a, a second collimation lens 910b, an FEL 1100, a polarization converter 1200, an illumination lens 920, a first inner mirror 1301, a second inner mirror 1302, a third inner mirror 1303, a liquid crystal display 1055, a first mirror 1002, a second mirror 1003, and a combiner CB.

The light source 1052, the first collimation lens 910a, the second collimation lens 910b, the FEL 1100, the polarization converter 1200, the illumination lens 920, the first inner mirror 1301, the second inner mirror 1302, the third inner mirror 1303, the liquid crystal display 1055, the first mirror 1002, the second mirror 1003, and the combiner CB may be disposed in that order with respect to the optical path.

The light source 1052 may output unpolarized light.

The first collimation lens 910a and the second collimation lens 910b may emit the light beams from the light source 1052 to the FEL 1110 so as to be parallel to each other.

The FEL 1100 may expand light beams incident on the plurality of cells to a uniform size, and may provide the uniform light beams to the polarization converter 1200.

The polarization converter 1200 may convert unpolarized light incident thereon into single linearly polarized light.

The illumination lens 920, the first inner mirror 1301, the second inner mirror 1302, and the third inner mirror 1303 may focus single linearly polarized light on the liquid crystal display 1055.

One surface of the illumination lens 920 may face the polarization converter 1200, and the opposite surface thereof may face the first inner mirror 1301.

The first inner mirror 1301 may be disposed so as to be inclined with respect to the illumination lens 920.

At least a portion of the first inner mirror 1301 may face the illumination lens 920. At least a portion of the first inner mirror 1301 may face the second inner mirror 1302.

The second inner mirror 1302 may be disposed so as to be inclined with respect to the first inner mirror 1301.

At least a portion of the second inner mirror 1302 may face the first inner mirror 1301. At least a portion of the second inner mirror 1302 may face the third inner mirror 1303.

The third inner mirror 1303 may be disposed so as to be inclined with respect to the second inner mirror 1302.

At least a portion of the third inner mirror 1303 may face the second inner mirror 1302. At least a portion of the third inner mirror 1303 may face the liquid crystal display 1055.

The liquid crystal display 1055 may transmit the single linearly polarized light, and thus may emit display light.

The liquid crystal display 1055 may be disposed so as to be inclined with respect to the third inner mirror 1303.

One surface of the liquid crystal display 1055 may face the third inner mirror 1303, and the opposite surface thereof may face the first mirror 1002.

The first mirror 1002 may be disposed so as to be inclined with respect to the liquid crystal display 1055. Here, the first mirror 1002 may be a flat mirror.

At least a portion of the first mirror 1002 may face the liquid crystal display 1055. At least a portion of the first mirror 1002 may face the second mirror 1003.

The second mirror 1003 may be disposed so as to be inclined with respect to the first mirror 1002. Here, the second mirror 1003 may be a flat mirror.

At least a portion of the second mirror 1003 may face the first mirror 1002. At least a portion of the second mirror 1003 may face the combiner CB.

The first mirror 1002 and the second mirror 1003 may reflect the display light emitted from the liquid crystal display 1055 to the combiner CB.

The combiner CB may receive the display light and may display an image.

Figure 13A:
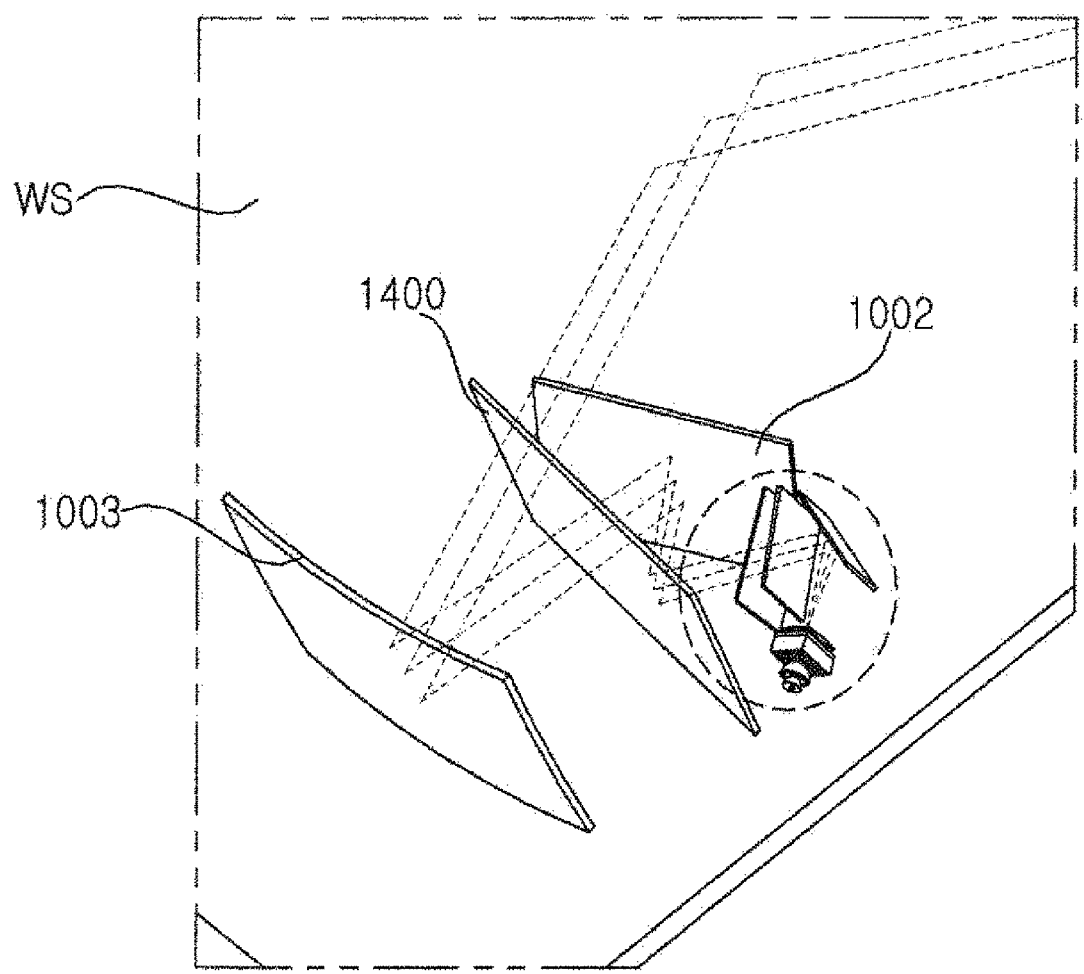
FIGS. 13A and 13B are views to be referred to for explaining the head-up display device according to the embodiment of the present invention.
Figure 13B:
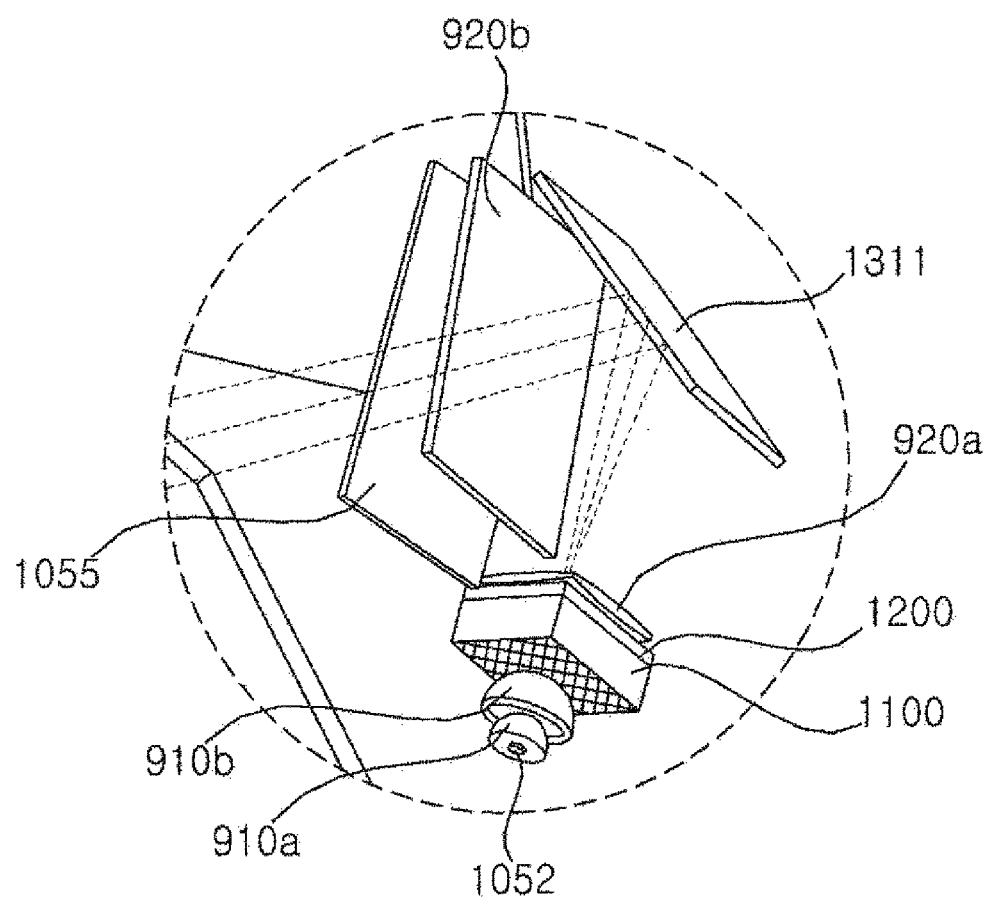

FIGS. 13A and 13B are views to be referred to for explaining the head-up display device according to the embodiment of the present invention.

Referring to FIGS. 13A and 13B, the head-up display device 1000 may include a light source 1052, a first collimation lens 910a, a second collimation lens 910b, an FEL 1100, a polarization converter 1200, a first illumination lens 920a, an inner mirror 1311, a second illumination lens 920b, a liquid crystal display 1055, a wide grid polarizer 1400, a first mirror 1002, and a second mirror 1003.

The light source 1052, the first collimation lens 910a, the second collimation lens 910b, the FEL 1100, the polarization converter 1200, the first illumination lens 920a, the inner mirror 1311, the second illumination lens 920b, the liquid crystal display 1055, the wide grid polarizer 1400, the first mirror 1002, and the second mirror 1003 may be disposed in that order with respect to the optical path.

The light source 1052 may output unpolarized light.

The first collimation lens 910a and the second collimation lens 910b may emit the light beams from the light source 1052 to the FEL 1110 so as to be parallel to each other.

The FEL 1100 may expand light beams incident on the plurality of cells to a uniform size, and may provide the uniform light beams to the polarization converter 1200.

The polarization converter 1200 may convert unpolarized light incident thereon into single linearly polarized light.

The first illumination lens 920a, the inner mirror 1311, and the second illumination lens 920b may focus single linearly polarized light on the liquid crystal display 1055.

One surface of the first illumination lens 920a may face the polarization converter 1200, and the opposite surface thereof may face the inner mirror 1311.

The inner mirror 1311 may be disposed so as to be inclined with respect to the first illumination lens 920a.

At least a portion of the inner mirror 1311 may face the first illumination lens 920a. At least a portion of the inner mirror 1311 may face the second illumination lens 920b.

The second illumination lens 920b may be disposed so as to be inclined with respect to the inner mirror 1311.

One surface of the second illumination lens 920b may face the inner mirror 1311, and the opposite surface thereof may face the liquid crystal display 1055.

The liquid crystal display 1055 may transmit the single linearly polarized light, and thus may emit display light.

The liquid crystal display 1055 may be larger than the second illumination lens 920b.

The liquid crystal display 1055 may be disposed parallel to the second illumination lens 920b.

One surface of the liquid crystal display 1055 may face the second illumination lens 920b, and the opposite surface thereof may face the wide grid polarizer 1400.

The wire grid polarizer (WGP) 1400 may reflect linearly polarized light that is perpendicular to the polarization transmission axis and may transmit linearly polarized light that is aligned with the polarization transmission axis.

The wire grid polarizer 1400 may be disposed so as to be inclined with respect to the liquid crystal display 1055.

At least a portion of the wire grid polarizer 1400 may face the liquid crystal display 1055.

At least a portion of the wire grid polarizer 1400 may face the first mirror 1002.

The first mirror 1002 may be disposed so as to be inclined with respect to the wide grid polarizer 1400. Here, the first mirror 1002 may be a flat mirror.

At least a portion of the first mirror 1002 may face the wide grid polarizer 1400. At least a portion of the first mirror 1002 may face the second mirror 1003.

The second mirror 1003 may be disposed so as to be inclined with respect to the first mirror 1002. Here, the second mirror 1003 may be a concave mirror.

At least a portion of the second mirror 1003 may face the first mirror 1002. At least a portion of the second mirror 1003 may face the windshield WS.

The wire grid polarizer 1400, the first mirror 1002, and the second mirror 1003 may reflect the display light emitted from the liquid crystal display 1055 to the windshield.

The windshield WS may receive the display light and may display an image.

Figure 14A:
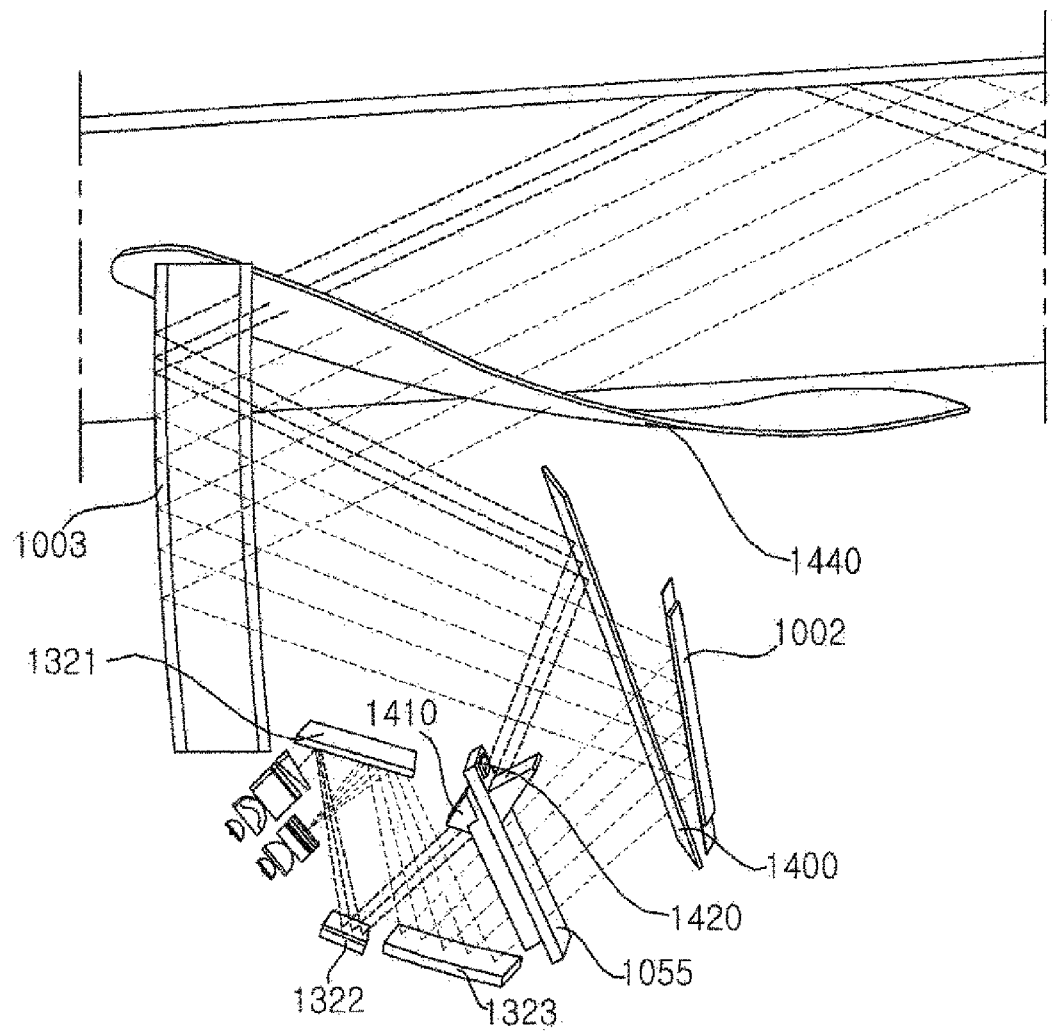
FIGS. 14A and 14B are views to be referred to for explaining the head-up display device according to the embodiment of the present invention.
Figure 14B:
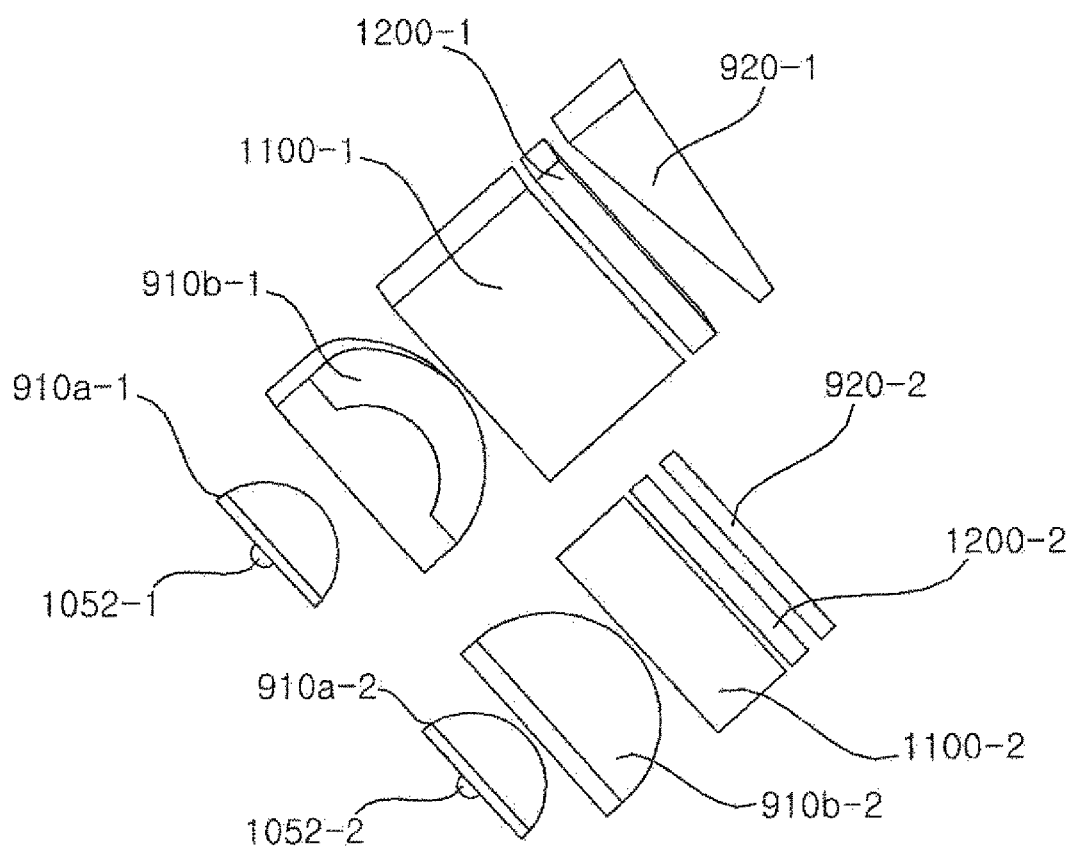

FIGS. 14A and 14B are views to be referred to for explaining the head-up display device according to the embodiment of the present invention.

Referring to FIGS. 14A and 14B, the head-up display device 1000 may include a light source 1052, a plurality of collimation lenses 910a-1, 910a-2, 910b-1 and 910b-2, an FEL 1100, a polarization converter 1200, an illumination lens 920, a first inner mirror 1321, a second inner mirror 1322, a third inner mirror 1323, a prism 1410, a liquid crystal display 1055, a half-wave plate 1420, a wide grid polarizer 1400, a first mirror 1002, a second mirror 1003, and a cover 1440.

The light source 1052, the plurality of collimation lenses 910a-1, 910a-2, 910b-1 and 910b-2, the FEL 1100, the polarization converter 1200, the illumination lens 920, the first inner mirror 1321, the second inner mirror 1322, the third inner mirror 1323, the prism 1410, the liquid crystal display 1055, the half-wave plate 1420, the wide grid polarizer 1400, the first mirror 1002, the second mirror 1003, and the cover 1440 may be disposed in that order with respect to the optical path.

The light source 1052 may output unpolarized light.

The light source 1052 may include a first light source 1052-1 and a second light source 1052-2.

The first light source 1052-1 may generate first unpolarized light.

For example, the first light source 1052-1 may generate first unpolarized light for generating an indicator image.

The first light source 1052-1 may be disposed parallel to the second light source 1052-2.

The second light source 1052-2 may generate second unpolarized light.

For example, the second light source 1052-1 may generate second unpolarized light for generating an augmented-reality image.

The second light source 1052-2 may be disposed parallel to the first light source 1052-1.

The direction in which the first unpolarized light is emitted from the first light source 1052-1 may be parallel to the direction in which the second unpolarized light is emitted from the second light source 1052-2.

The plurality of collimation lenses 910a-1, 910a-2, 910b-1 and 910b-2 may emit light beams from the light source 1052 to the FEL 1110 so as to be parallel to each other.

The 1-1st collimation lens 910a-1 and the 2-1st collimation lens 910b-1 may emit the first unpolarized light beams from the first light source 1052-1 to a first FEL 1100-1 so as to be parallel to each other.

The 1-2nd collimation lens 910a-2 and the 2-2nd collimation lens 910b-2 may emit the second unpolarized light beams from the second light source 1052-2 to a second FEL 1100-2 so as to be parallel to each other.

The FEL 1100 may expand light beams incident on the plurality of cells to a uniform size, and may provide the uniform light beams to the polarization converter 1200.

The FEL 1100 may include the first FEL 1100-1 and the second FEL 1100-2.

The first FEL 1100-1 may uniformly provide the light beams generated by the first light source 1051-1 to the first polarization converter 1200-1.

The first FEL 1100-1 may have a larger volume than the second FEL 1100-2.

The second FEL 1100-2 may uniformly provide the light beams generated by the second light source 1051-2 to the second polarization converter 1200-2.

The polarization converter 1200 may convert unpolarized light incident thereon into single linearly polarized light.

The polarization converter 1200 may include a first polarization converter 1200-1 and a second polarization converter 1200-2.

The first polarization converter 1200-1 may convert the first unpolarized light into single linearly polarized light.

As described above, the first polarization converter 1200-1 may include a polarizer beam splitter 1210 and a half-wave plate 1220.

The second polarization converter 1200-2 may convert the second unpolarized light into single linearly polarized light.

As described above, the second polarization converter 1200-2 may include a polarizer beam splitter 1210 and a half-wave plate 1220.

The illumination lens 920, the first inner mirror 1321, the second inner mirror 1322, and the third inner mirror 1323 may focus the single linearly polarized light on the liquid crystal display 1055.

The illumination lens 920 may include the first illumination lens 920-1 and the second illumination lens 920-2.

One surface of the first illumination lens 920-1 may face the first polarization converter 1200-1, and the opposite surface thereof may face the first inner mirror 1321.

One surface of the second illumination lens 920-2 may face the second polarization converter 1200-2, and the opposite surface thereof may face the first inner mirror 1321.

The first inner mirror 1321 may reflect first single linearly polarized light based on the first unpolarized light and second single linearly polarized light based on the second unpolarized light.

The first inner mirror 1321 may reflect the single linearly polarized light based on the first unpolarized light incident from the first illumination lens 920-1 to the second inner mirror 1322.

The first inner mirror 1321 may reflect the single linearly polarized light based on the second unpolarized light incident from the second illumination lens 920-2 to the third inner mirror 1323.

The first inner mirror 1321 may be disposed so as to be inclined with respect to the first illumination lens 920-1 and the second illumination lens 920-2.

At least a portion of the first inner mirror 1321 may face the first illumination lens 920-1. At least a portion of the first inner mirror 1321 may face the second inner mirror 1322.

At least a portion of the first inner mirror 1321 may face the second illumination lens 920-2. At least a portion of the first inner mirror 1321 may face the third inner mirror 1323.

The first inner mirror 1321 may be a flat mirror.

Meanwhile, a first distance may be shorter than a second distance. Here, the first distance may be defined as the distance from the first light source 1052-1 to the region of the first inner mirror 1321 at which the first linearly polarized light based on the first unpolarized light is reflected. The second distance may be defined as the distance from the second light source 1052-2 to the region of the first inner mirror 1321 at which the second linearly polarized light based on the second unpolarized light is reflected.

The second inner mirror 1322 may reflect the first single linearly polarized light reflected by the first inner mirror 1321.

The second inner mirror 1322 may provide the prism 1410 with the first single linearly polarized light based on the first unpolarized light, which is incident from the first inner mirror 1321.

The second inner mirror 1322 may be disposed so as to be inclined with respect to the first inner mirror 1321.

At least a portion of the second inner mirror 1322 may face the first inner mirror 1321. At least a portion of the second inner mirror 1322 may face the prism 1410.

The second inner mirror 1322 may have a predetermined curvature. The second inner mirror 1322 may have a curvature different from the curvature of the third inner mirror 1323.

The third inner mirror 1323 may reflect the second single linearly polarized light reflected by the first inner mirror 1321.

The third inner mirror 1323 may provide the liquid crystal display 1055 with the second single linearly polarized light based on the second unpolarized light, which is incident from the first inner mirror 1321.

The third inner mirror 1323 may be disposed so as to be inclined with respect to the first inner mirror 1321.

At least a portion of the third inner mirror 1323 may face the first inner mirror 1321. At least a portion of the third inner mirror 1323 may face the liquid crystal display 1055.

The third inner mirror 1323 may have a predetermined curvature. The third inner mirror 1323 may have a curvature different from the curvature of the second inner mirror 1323.

For example, the third inner mirror 1323 may have a curvature greater than the curvature of the second inner mirror 1323 in order to concentrate the reflected second single linearly polarized light more than the first single linearly polarized light.

The third inner mirror 1323 may be disposed parallel to the second inner mirror 1322.

The third inner mirror 1323 may be located in a virtual plane in which the second inner mirror 1322 is located. That is, the virtual plane in which the third inner mirror 1323 is located and the virtual plane in which the second inner mirror 1322 is located may be the same plane. The prism 1410 may be disposed between the light source 1052 and the liquid crystal display 1055. The prism 1410 may be disposed between the first light source 1052-1 and the liquid crystal display 1055 in the optical path.

The prism 1410 may be disposed between the second inner mirror 1322 and the liquid crystal display 1055.

The prism 1410 may change the path of the light introduced thereinto.

The prism 1410 may direct the single linearly polarized light based on the first unpolarized light to the wire grid polarizer 1400.

For example, the prism 1410 may change the optical path such that the single linearly polarized light based on the first unpolarized light penetrates the liquid crystal display 1055 and is directed to the wire grid polarizer 1400.

The prism 1410 may set the emission angle of the first single linearly polarized light differently from the emission angle of the second single linearly polarized light with respect to the liquid crystal display 1055.

The liquid crystal display 1055 may transmit the single linearly polarized light and may emit display light. In this process, the direction of the linearly polarized light may be changed.

In one example, when S-wave linearly polarized light is incident thereon, the liquid crystal display 1055 may emit display light that is P-wave linearly polarized light.

In another example, when P-wave linearly polarized light is incident thereon, the liquid crystal display 1055 may emit display light that is S-wave linearly polarized light.

The liquid crystal display 1055 may receive the first single linearly polarized light reflected by the second inner mirror 1322 and the second single linearly polarized light reflected by the third inner mirror 1323 in the same plane thereof. Here, the surface of the liquid crystal display 1055 to which the first single linearly polarized light and the second single linearly polarized light are provided may be defined as an incidence surface of the liquid crystal display 1055.

The liquid crystal display 1055 may emit first display light based on the first single linearly polarized light and second display light based on the second single linearly polarized light. Here, the surface of the liquid crystal display 1055 from which the first display light and the second display light are emitted may be defined as an emission surface.

One surface of the liquid crystal display 1055 may face the second inner lens 1322 and the third inner lens 1323, and the opposite surface thereof may face the wire grid polarizer 1400.

The half-wave plate 1420 may shift, among the linearly polarized light beams emitted from the liquid crystal display 1055, linearly polarized light based on the first unpolarized light by ½ wavelength.

The half-wave plate 1420 may emit the wavelength-shifted linearly polarized light to the wide grid polarizer 1400.

The half-wave plate 1420 may be disposed between the liquid crystal display 1550 and the wide grid polarizer.

The wide grid polarizer 1400 may reflect linearly polarized light that is perpendicular to the polarization transmission axis and may transmit linearly polarized light that is aligned with the polarization transmission axis.

The wide grid polarizer 1400 may reflect the linearly polarized light emitted from the liquid crystal display 1055, the wavelength of which has been shifted by the half-wave plate 1420.

The linearly polarized light reflected by the wide grid polarizer 1400 may travel to the second mirror 1003.

The wide grid polarizer 1400 may transmit, among the linearly polarized light beams emitted from the liquid crystal display 1055, linearly polarized light based on the second unpolarized light.

The linearly polarized light transmitted by the wide grid polarizer 1400 may travel to the first mirror 1002.

Due to the first to third inner mirrors 1321, 1322 and 1323 and the wide grid polarizer 1400, the first optical path through which the light generated by the first light source 1052-1 reaches the windshield WS may differ from the second optical path through which the light generated by the second light source 1052-2 reaches the windshield WS.

The first optical path through which the light generated by the first light source 1052-1 reaches the screen may be shorter than the second optical path through which the light generated by the second light source 1052-2 reaches the screen.

As a result, the image based on the light generated by the first light source 1052-1 may be seen to be closer to the user than the image based on the light generated by the second light source 1052-2.

The wire grid polarizer 1400 may be disposed so as to be inclined with respect to the liquid crystal display 1055.

At least a portion of the wire grid polarizer 1400 may face the liquid crystal display 1055 in a first direction.

At least a portion of the wire grid polarizer 1400 may face the first mirror 1002 in a second direction, which is different from the first direction.

One surface of the wire grid polarizer 1400 may face the first mirror 1002, and the opposite surface thereof may face the second mirror 1003.

The first mirror 1002 may reflect, among the linearly polarized light beams emitted from the liquid crystal display 1055, linearly polarized light based on the second unpolarized light. The reflected linearly polarized light may travel to the second mirror 1003.

The first mirror 1002 may be disposed so as to be inclined with respect to the wide grid polarizer 1400. Here, the first mirror 1002 may be a flat mirror.

At least a portion of the first mirror 1002 may face the wide grid polarizer 1400. At least a portion of the first mirror 1002 may face the second mirror 1003.

The second mirror 1003 may reflect the linearly polarized light reflected by the wide grid polarizer 1400 toward the screen. Here, the screen may be the windshield WS or the combiner CB.

The second mirror 1003 may reflect the linearly polarized light reflected by the first mirror 1002 toward the screen.

The second mirror 1003 may be disposed so as to be inclined with respect to the first mirror 1002. Here, the second mirror 1003 may be a concave mirror.

At least a portion of the second mirror 1003 may face the first mirror 1002. At least a portion of the second mirror 1003 may face the windshield WS.

The wire grid polarizer 1400, the first mirror 1002, and the second mirror 1003 may reflect the display light emitted from the liquid crystal display 1055 to the windshield.

The windshield WS may receive the display light and may display an image.

The aforementioned present invention may be implemented as computer-readable code stored on a computer-readable recording medium. The computer-readable recording medium may be any type of recording device in which data is stored in a computer-readable manner. Examples of the computer-readable recording medium include a Hard Disk Drive (HDD), a Solid State Disk (SSD), a Silicon Disk Drive (SDD), Read-Only Memory (ROM), Random-Access Memory (RAM), CD-ROM, magnetic tapes, floppy disks, optical data storage devices, carrier waves (e.g. transmission via the Internet), etc. In addition, the computer may include a processor and a controller. The above embodiments are therefore to be construed in all aspects as illustrative and not restrictive. It is intended that the present invention cover the modifications and variations of this invention provided they come within the scope of the appended claims and their equivalents.

The invention claimed is:

1. A head-up display device for a vehicle, comprising: at least one light source; a liquid crystal display; and at least one polarization converter disposed between the light source and the liquid crystal display, the polarization converter being configured to convert unpolarized light generated by the light source into single linearly polarized light and to provide the single linearly polarized light to the liquid crystal display, wherein the light source comprises a first light source configured to generate first unpolarized light, and a second light source configured to generate second unpolarized light, and wherein the polarization converter comprises a first polarization converter configured to convert the first unpolarized light into single linearly polarized light, and a second polarization converter configured to convert the second unpolarized light into single linearly polarized light, a first inner mirror configured to reflect first linearly polarized light based on the first unpolarized light and second linearly polarized light based on the second unpolarized light, wherein a first distance from the first light source to a region of the first inner mirror at which the first linearly polarized light is reflected is shorter than a second distance from the second light source to a region of the first inner mirror at which the second linearly polarized light is reflected.

2. The head-up display device of claim 1, wherein the polarization converter comprises:
   a polarizer beam splitter (PBS) configured to split unpolarized light generated by the light source into first linearly polarized light and second linearly polarized light; and a half-wave plate (HWP) configured to convert the second linearly polarized light into the first linearly polarized light.

3. The head-up display device of claim 1, further comprising:
   a fly eye lens (FEL) disposed between the light source and the polarization converter, the FEL having an optic pattern, wherein one surface of the polarization converter faces the FEL.

4. The head-up display device of claim 1, further comprising:
   at least one mirror disposed between the light source and the liquid crystal display.

5. The head-up display device of claim 1, further comprising:
   a half-wave plate configured to shift, among linearly polarized light beams emitted from the liquid crystal display, linearly polarized light based on the first unpolarized light by ½ wavelength.

6. The head-up display device of claim 5, further comprising:
   a wire grid polarizer (WGP) configured to reflect linearly polarized light emitted from the liquid crystal display, a wavelength of which has been shifted by the half-wave plate, and to transmit, among linearly polarized light beams emitted from the liquid crystal display, linearly polarized light based on the second unpolarized light.

7. The head-up display device of claim 6, wherein the wide grid polarizer is disposed so as to be inclined with respect to the liquid crystal display.

8. The head-up display device of claim 7, wherein the wide grid polarizer is disposed such that one surface thereof faces the first mirror and an opposite surface thereof faces the second mirror.

9. The head-up display device of claim 7, wherein the half-wave plate is disposed between the liquid crystal display and the wide grid polarizer.

10. The head-up display device of claim 7, wherein a first optical path through which light generated by the first light source reaches the screen is shorter than a second optical path through which light generated by the second light source reaches the screen.

11. The head-up display device of claim 7, further comprising:
    a prism disposed between the first light source and the liquid crystal display, the prism being configured to direct single linearly polarized light based on the first unpolarized light to the wire grid polarizer.

12. The head-up display device of claim 7, further comprising:
    a first mirror configured to reflect, among linearly polarized light beams emitted from the liquid crystal display, linearly polarized light based on the second unpolarized light; and a second mirror configured to reflect linearly polarized light reflected by the wide grid polarizer toward a screen and to reflect linearly polarized light reflected by the first mirror toward the screen.

13. The head-up display device of claim 12, wherein the wide grid polarizer faces the liquid crystal display in a first direction and faces the first mirror in a second direction.

14. The head-up display device of claim 1, wherein a direction in which first unpolarized light is emitted from the first light source is parallel to a direction in which second unpolarized light is emitted from the second light source.

15. The head-up display device of claim 1, further comprising: a second inner mirror configured to reflect the first linearly polarized light reflected by the first inner mirror; and a third inner mirror configured to reflect the second linearly polarized light reflected by the first inner mirror, and wherein the second inner mirror has a curvature different from a curvature of the third inner mirror.

16. The head-up display device of claim 15, wherein the liquid crystal display receives the
    first linearly polarized light reflected by the second inner mirror and the second linearly polarized light reflected by the third inner mirror in a same plane thereof.

17. The head-up display device of claim 16, further comprising:
    a prism disposed between the second inner mirror and the liquid crystal display,
    wherein the prism sets an emission angle of the first linearly polarized light differently from an emission angle of the second linearly polarized light with respect to the liquid crystal display.

18. The head-up display device of claim 15, wherein the third inner mirror is disposed parallel to the second inner mirror.

* * * * *